US011068315B2

(12) United States Patent
Ramesh et al.

(10) Patent No.: US 11,068,315 B2
(45) Date of Patent: Jul. 20, 2021

(54) HYPERVISOR ATTACHED VOLUME GROUP LOAD BALANCING

(71) Applicant: Nutanix, Inc., San Jose, CA (US)

(72) Inventors: Aditya Ramesh, San Jose, CA (US); Ashwin Thennaram Vakkayil, Kerala (IN); Felipe Franciosi, Cambridge (GB); Kamalneet Singh, Bangalore (IN); Manosiz Bhattacharyya, San Jose, CA (US); Miao Cui, New York, NY (US); Tabrez Parvez Memon, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 192 days.

(21) Appl. No.: 15/944,509

(22) Filed: Apr. 3, 2018

(65) Prior Publication Data

US 2019/0370079 A1 Dec. 5, 2019

(51) Int. Cl.
| | |
|---|---|
| *G06F 9/455* | (2018.01) |
| *G06F 9/46* | (2006.01) |
| *G06F 9/50* | (2006.01) |
| *G06F 3/06* | (2006.01) |
| *H04L 29/08* | (2006.01) |

(52) U.S. Cl.
CPC ............ *G06F 9/5077* (2013.01); *G06F 3/067* (2013.01); *G06F 3/0665* (2013.01); *G06F 9/45558* (2013.01); *G06F 9/505* (2013.01); *G06F 9/5083* (2013.01); *G06F 2009/4557* (2013.01); *G06F 2009/45595* (2013.01); *H04L 67/1097* (2013.01)

(58) Field of Classification Search
CPC ...... G06F 9/5077; G06F 9/505; G06F 9/5083; G06F 9/45558; G06F 2009/45595; G06F 2009/4557; G06F 3/0665; G06F 3/067; H04L 67/1097
See application file for complete search history.

(56) References Cited

U.S. PATENT DOCUMENTS

| | | | | |
|---|---|---|---|---|
| 5,697,054 A | * | 12/1997 | Andersson | H04W 24/02 455/524 |
| 6,378,039 B1 | * | 4/2002 | Obara | G06F 3/0601 711/114 |
| 8,549,518 B1 | | 10/2013 | Aron et al. | |
| 8,601,473 B1 | | 12/2013 | Aron et al. | |
| 8,850,130 B1 | | 9/2014 | Aron et al. | |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Emerson C Puente
*Assistant Examiner* — Zhi Chen
(74) *Attorney, Agent, or Firm* — Vista IP Law Group, LLP

(57) ABSTRACT

Communication between VMs running in a clustered virtualization environment and a distributed storage system is managed. The distributed storage system consists of multiple storage/compute nodes. A hypervisor communicates with a controller in a local node on behalf of a VM. The controller will redirect a connection to a second controller on different node. The controller to which the connection is redirected is selected so as to distribute the load evenly across the cluster.

18 Claims, 21 Drawing Sheets

(56) References Cited

U.S. PATENT DOCUMENTS

| | | | | |
|---|---|---|---|---|
| 9,424,059 | B1* | 8/2016 | Sivaprakasam | H04L 65/80 |
| 9,772,866 | B1 | 9/2017 | Aron et al. | |
| 2005/0063216 | A1* | 3/2005 | Wilkins | G06F 12/0873 365/154 |
| 2009/0070579 | A1* | 3/2009 | Murakami | H04L 63/0815 713/155 |
| 2009/0240975 | A1* | 9/2009 | Shitomi | G06F 3/067 714/5.11 |
| 2012/0124312 | A1* | 5/2012 | Vemuri | G06F 3/0635 711/163 |
| 2013/0174152 | A1* | 7/2013 | Yu | G01R 21/00 718/1 |
| 2015/0169233 | A1* | 6/2015 | Anderson | G06F 3/0613 711/173 |
| 2015/0293708 | A1* | 10/2015 | Lang | G06F 3/067 711/114 |
| 2016/0204977 | A1* | 7/2016 | Cui | H04L 41/0668 370/221 |
| 2016/0337245 | A1* | 11/2016 | Yamada | H04L 41/0813 |
| 2019/0228093 | A1* | 7/2019 | Falcao | G06F 16/27 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", *14th USENIX Symposium on Networked Systems Design and Implementation, NSDI '17*, (Mar. 27, 2017).

\* cited by examiner

HYPERVISOR ATTACHED VOLUME GROUP LOAD BALANCING

CROSS-REFERENCE TO RELATED APPLICATIONS

The present application is related to U.S. patent application Ser. No. 15/607,202, filed on May 26, 2017, titled "EFFICIENT SCALING OF DISTRIBUTED STORAGE SYSTEMS," which is hereby incorporated by reference in its entirety.

FIELD

This disclosure concerns a method, a computer program product, and a computer system for achieving hypervisor attached volume group load balancing.

BACKGROUND

Load balancing is a technique often used in computing systems to distribute a workload across multiple computing resources. This technique allows a computing system to optimize resource usage by spreading a workload such that any single resource of the computing system does not get overloaded when other resources of the computing system are able to handle some of the workload.

Load balancing can be accomplished using client-side software, such as multipath I/O. Load balancing using client-side software requires configuring the client side to configure the IP addresses of all the storage controllers in a storage system. The problem with this approach is that it is difficult to configure and manage the storage controllers in a scale out system, such as a clustered virtualization environment, in which nodes can be added and/or removed at any time.

Therefore, there is a need for an improved method, system, and computer program product to implement load balancing.

SUMMARY

Embodiments of the present invention provide a method, a computer program product, and a computer system for achieving hypervisor attached volume group load balancing. According to some embodiments, communication between virtual machines ("VMs") running in a clustered virtualization environment and a distributed storage system is managed. The distributed storage system consists of multiple storage/compute nodes, in which the storage may be emulated as virtual disks ("vDisks"). Multiple vDisks to which a set of policies is applied (e.g., a set of load balancing policies) may be grouped into a volume group ("VG"). A VG may be partitioned into multiple shards, such that each shard corresponds to a set of vDisks or logical unit numbers ("LUNs") within the VG.

Load balancing across multiple nodes in the clustered virtualization environment is achieved by managing requests from VMs supported by the nodes to access one or more LUNs corresponding to one or more shards assigned to storage controllers of the nodes. A hypervisor within a local node of the clustered virtualization environment communicates an iSCSI login request to a first storage controller of the local node on behalf of a VM supported by the local node. The first storage controller may redirect the iSCSI login request to a second storage controller of a different node. The second storage controller to which the iSCSI login request is redirected is selected so as to distribute the load evenly across the nodes in the clustered virtualization environment. An iSCSI connection may then be established between the hypervisor and the second storage controller, allowing a request originating from the VM supported by the local node to access LUN(s)/shard(s) assigned to the second storage controller to be directed to the second storage controller. Information identifying the second storage controller to which the LUN(s)/shard(s) have been assigned is then stored. An additional iSCSI connection may be created for each additional shard of the VG and information identifying each storage controller to which the corresponding LUN(s)/shard(s) have been assigned may be stored in a similar manner. Once an iSCSI connection has been established for each shard of the VG, the hypervisor may direct a request received from the VM to access LUN(s)/shard(s) in the VG to the appropriate storage controller via the iSCSI connections based on the stored information.

In some embodiments, loads associated with one or more of the nodes in the clustered virtualization environment may be determined (e.g., by a load balancer within the clustered virtualization environment). Based on the loads and a set of load balancing policies applied to the VG, one or more of the shards and their corresponding iSCSI connections may be moved to different storage controllers to more evenly distribute the loads across the nodes. In various embodiments, new nodes may be added to the clustered virtualization environment. In such embodiments, the VG may be repartitioned and the iSCSI connections may be reestablished between the hypervisor and the storage controllers, allowing requests from VMs supported by a local node to access various shards to be directed to the appropriate storage controllers of the original nodes and the new nodes via the iSCSI connections. Similarly, in some embodiments, nodes may be removed from the clustered virtualization environment. In such embodiments, the VG may be repartitioned and the iSCSI connections may be reestablished between the hypervisor and the storage controllers, allowing requests from VMs supported by the local node to access various shards to be directed to the appropriate storage controllers of the remaining nodes via the iSCSI connections.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
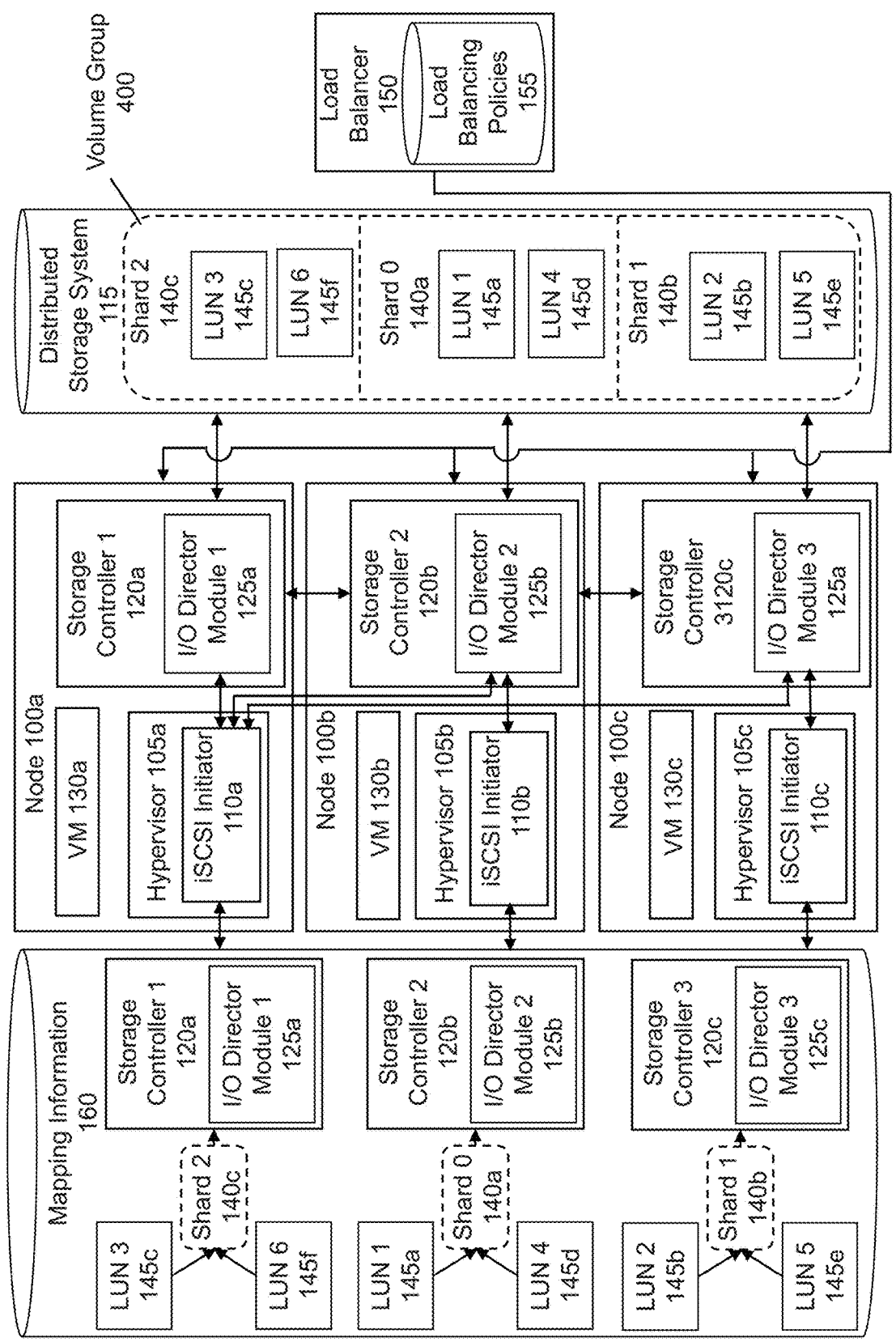
FIG. 1 illustrates a clustered virtualization environment in which some embodiments of the invention are implemented.

The present disclosure provides an improved approach for achieving hypervisor attached volume group load balancing.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

This disclosure will now discuss an approach for achieving hypervisor attached volume group load balancing. In a clustered virtualization environment, storage within a distributed storage system consisting of multiple storage/compute nodes is emulated as virtual disks ("vDisks"). Based on a volume group construct, multiple vDisks to which a set of policies is applied (e.g., a set of load balancing policies) may be grouped into a volume group ("VG") and each VG may be exposed as a single iSCSI target to an iSCSI client (e.g., an iSCSI initiator, described below). Furthermore, each VG may be partitioned into multiple shards, such that each shard corresponds to a set of vDisks or logical unit numbers ("LUNs") within the VG. To achieve hypervisor attached volume group load balancing across the nodes in the clustered virtualization environment, shards of the VG are assigned to different storage controllers of different nodes in the clustered virtualization environment based at least in part on a load associated with one or more of the nodes and the number of nodes. An iSCSI connection may then be established for each shard. An iSCSI initiator of a hypervisor within a local node of the clustered virtualization environment may establish an iSCSI connection with a storage controller of the same or a different node, which allows a request from a virtual machine ("VM") supported by the local node to access a set of LUNs corresponding to a shard assigned to the storage controller to be directed to the storage controller. Information describing assignments of the shards to the storage controllers (e.g., information mapping each shard/each set of LUNs to a storage controller) is then stored in a location accessible by the iSCSI initiator. A request subsequently received from the VM to access one or more LUNs may be directed to an appropriate storage controller based at least in part on the information describing the assignments.

As the loads distributed across the nodes in the clustered virtualization environment change over time, one or more of the shards and their corresponding connections may be moved to different storage controllers to more evenly distribute the load across the cluster of nodes (e.g., based on a set of load balancing policies applied to the VG). Furthermore, as new nodes are added and/or removed from the clustered virtualization environment, the VG may be repartitioned and the iSCSI connections may be reestablished between the iSCSI initiator and the storage controllers, allowing requests from VMs supported by the local node to access various shards to be directed to the appropriate storage controllers via the iSCSI connections.

For illustrative purposes, FIG. 1 illustrates a clustered virtualization environment in which some embodiments of the invention are implemented. In various embodiments, the clustered virtualization environment may include more or fewer nodes 100 and each node 100 may support more or fewer VMs 130 than depicted in FIG. 1. Additionally, in some embodiments, more or fewer shards 140 may be assigned to each node 100 and each shard 140 may include more or fewer LUNs 145 than depicted in FIG. 1. Furthermore, conventional components of clustered virtualization environments, such as operating systems, API layers, and the like are not shown so as to not obscure the components of the clustered virtualization environment to be discussed with regard to FIG. 1.

A clustered virtualization environment may include multiple nodes 100a-c (e.g., servers, hyperconverged systems that integrate compute and storage, etc.), in which each node 100a-c supports one or more VMs 130a-c. A VM 130a-c refers to a specific software-based implementation of a machine in a virtualization environment, in which the hardware resources of a real computer (e.g., CPU, memory, storage, etc.) are virtualized or transformed into the underlying support for a fully functional VM 130a-c that can run its own operating system and applications on the underlying physical resources, just like a real computer. Virtualization works by inserting a thin layer of software directly on the computer hardware or on a host operating system. This layer of software contains a VM monitor or "hypervisor" 105a-c that allocates hardware resources of a node 100a-c dynamically and transparently.

Storage within nodes 100a-c of the clustered virtualization environment form a distributed storage system 115 that may have multiple separate databases. In such embodiments, the databases may be located in different physical locations and some of the databases may be accessible via a remote server. In some embodiments, the distributed storage system 115 may include multiple tiers of storage in a storage pool. The storage may be accessible through a network, such as a networked storage (e.g., a SAN, NAS, etc.). The storage pool also may include one or more instances of local storage that are directly attached to the nodes 100a-c and/or components associated with the nodes 100a-c. Such local storage may include solid state drives (SSDs), hard disk drives (HDDs), and/or other storage devices.

As described above, the storage within this distributed storage system 115 may be emulated as virtual disks ("vDisks"), in which each vDisk is exposed via iSCSI ("internet small computer system interface") and is mounted on a VM 130a-c supported by a node 100a-c. Each vDisk is managed by a storage controller 120a-c and corresponds to a virtual address space forming the individual bytes exposed as a disk to the VMs 130a-c. This address space is broken up into equal sized units called vDisk blocks. Each storage controller 120a-c may export one or more block devices or NFS server targets that appear as disks to the VMs 130a-c. Thus, to the VMs 130a-c, the storage controllers 120a-c appear to be exporting a clustered storage appliance that contains some disks. All user data (including the operating system) in the VMs 130a-c resides on these vDisks.

As described above, vDisks to which a set of policies is applied (e.g., a set of load balancing policies) may be grouped into a volume group ("VG") 400 and a VG 400 may be exposed as a single iSCSI target to an iSCSI client (e.g., the iSCSI initiator 110a-c, described below) in each of the nodes 100a-c. As also described above, a VG 400 may be partitioned into multiple shards 140a-c, such that each shard 140a-c corresponds to a set of logical unit numbers ("LUNs") 145a-f within the VG 400. As further described below, one or more shards 140a-c may be assigned to each storage controller 120a-c. The storage controllers 120a-c coordinate with each other to manage the storage resources (e.g., locally attached storage, networked storage, and cloud storage) corresponding to a VG 400. Therefore, access to LUNs 145a-f corresponding to each shard 140a-c is managed by the storage controller 120a-c to which the shard 140a-c is assigned.

Each storage controller 120a-c may include an I/O director module 125a-c, which is the main entry point into the storage controller 120a-c. In some embodiments, the I/O director module 125a-c implements the iSCSI protocol. For example, a write request originating from a VM 130a-c to write to a specific LUN 145a-f may be sent to an iSCSI target inside the VM's kernel. In this example, the write request may be intercepted by the I/O director module 125a-c running in user space. Continuing with this example, the I/O director module 125a-c may convert the request into an internal vDisk request and write the data to the physical storage in the distributed storage system 115.

In order to determine where to write and read data from the distributed storage system 115, an iSCSI initiator 110a-c, which is an iSCSI client that is a component of the hypervisor 105a-c of each node 100a-c, communicates with the I/O director modules 125a-c via iSCSI connections. An iSCSI initiator 110a-c may establish one or more iSCSI connections with the I/O director module 125a-c of the storage controller 120a-c of the same node 100a-c in which the iSCSI initiator 110a-c resides. An iSCSI initiator 110a-c also may establish one or more iSCSI connections with the I/O director module 125a-c of the storage controller 120a-c of a different node 100a-c, as further described below.

The iSCSI initiator 110a-c also maintains mapping information 160 to track the contents of the VG 400 (i.e., information mapping the LUNs 145a-f to their corresponding shards 140a-c and information identifying the storage controllers 120a-c to which the LUNs 145a-f/shards 140a-c have been assigned). This mapping information 160 may be accessed by the iSCSI initiator 110a-c when handling requests to access the LUNs 145a-f/shards 140a-c. In some embodiments, at least some of the mapping information 160 may be stored persistently (e.g., in a database). For example, as shown in FIG. 1, mapping information 160 that may be maintained by the iSCSI initiators 110a-c is stored in a database and includes information mapping each LUN 145a-f to its corresponding shard 140a-c. FIG. 1 also shows that the mapping information 160 maps each shard 140a-c to the storage controller 120a-c to which it was assigned.

As shown in FIG. 1, the clustered virtualization environment also may include a load balancer 150 that determines and distributes workloads across the nodes 100a-c. The load balancer 150 may determine workloads across the nodes 100a-c and distribute them to optimize usage of resources of the nodes 100a-c, to maximize throughput, to minimize response time, and to prevent any single node 100a-c from becoming overloaded. The load balancer 150 may distribute workloads across the nodes 100a-c based at least in part on one or more load balancing policies 155 that may be accessed by the load balancer 150. Examples of load balancing policies 155 may include policies that prioritize different types of workloads differently, policies that distribute workloads using one or more scheduling algorithms (e.g., round robin or random choice), policies that account for the geographic locations of different nodes 100a-c, etc. Although the load balancing policies 155 are depicted in FIG. 1 as being stored in a database located within the load balancer 150, in some embodiments, the load balancing policies 155 may be stored in a location external to the load balancer 150.

Figure 2A:
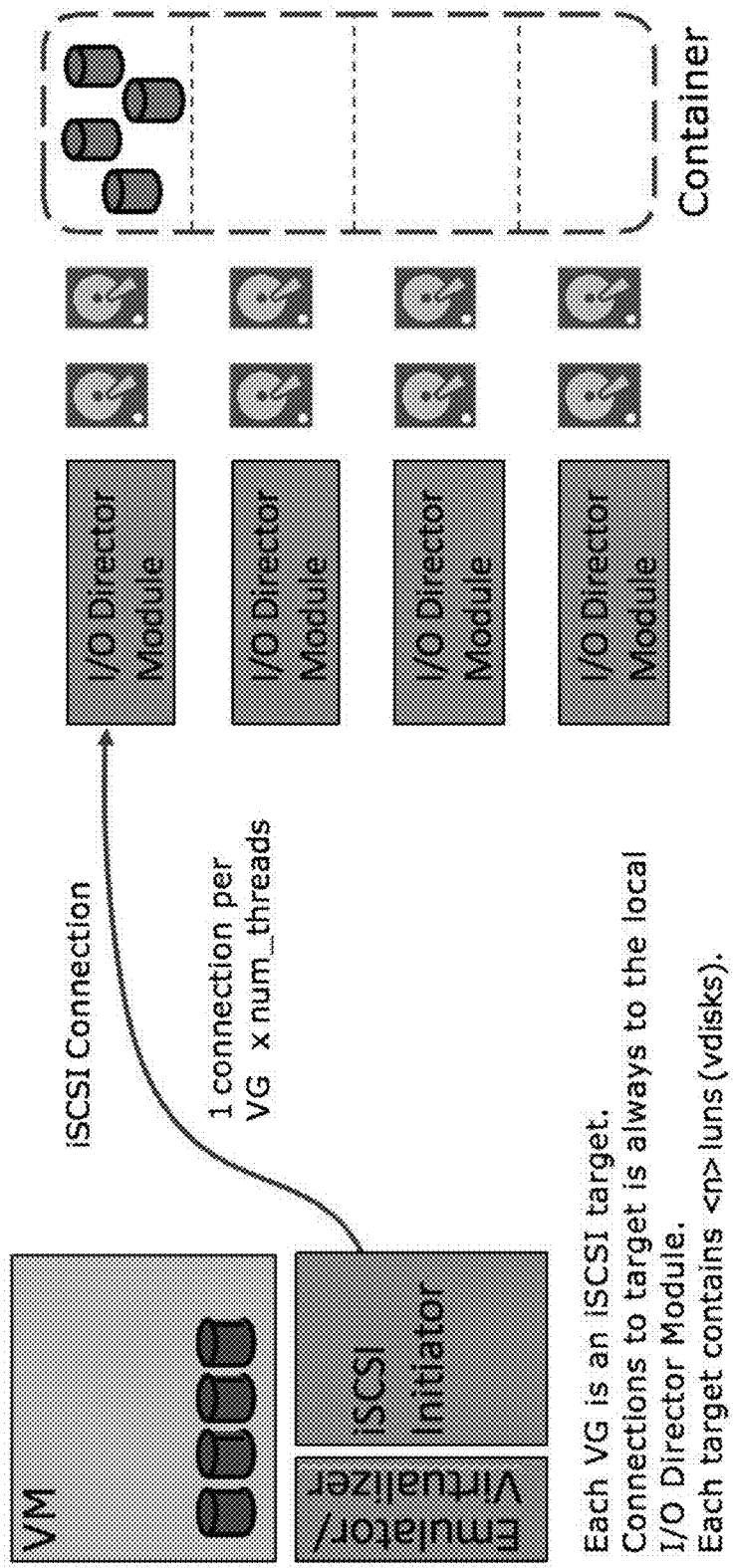
FIG. 2A illustrates a volume group without load balancing according to some embodiments of the invention.

FIG. 2A illustrates a volume group without load balancing according to some embodiments of the invention. As shown in this figure, a single iSCSI connection is established between an iSCSI initiator 110 and an I/O director module 125, in which the iSCSI initiator 110 is an iSCSI client and a component of a hypervisor 105 of a node 100 that supports a VM 130 and the I/O director module 125 is a component of a storage controller 120 of the same node 100. One iSCSI connection may be established for each VG 400 as a function of the number of threads. As shown in this example, the iSCSI initiator 110 may be multi-threaded and have a default of 2 threads. Furthermore, each VG 400 is an iSCSI target that contains a number of LUNs 145 that corresponds to the number of vDisks in the VG 400. FIG. 2A shows storage devices included in a container emulated by an Emulator/Virtualizer (i.e., as vDisks within a VG 400), in which the Emulator/Virtualizer also is a component of the hypervisor 105. Therefore, to the VM 130, the VG 400 appears as an iSCSI target with multiple LUNs 145 in it. Without load balancing, all the vDisks of the VG 400 are hosted on a single node 100. In this situation, if the VM 130 supported by the node 100 requires more storage resources than are available through the storage controller 120 of the node 100, performance of transactions requested by the VM 130 may be delayed until they become available, resulting in performance degradation.

Figure 2B:
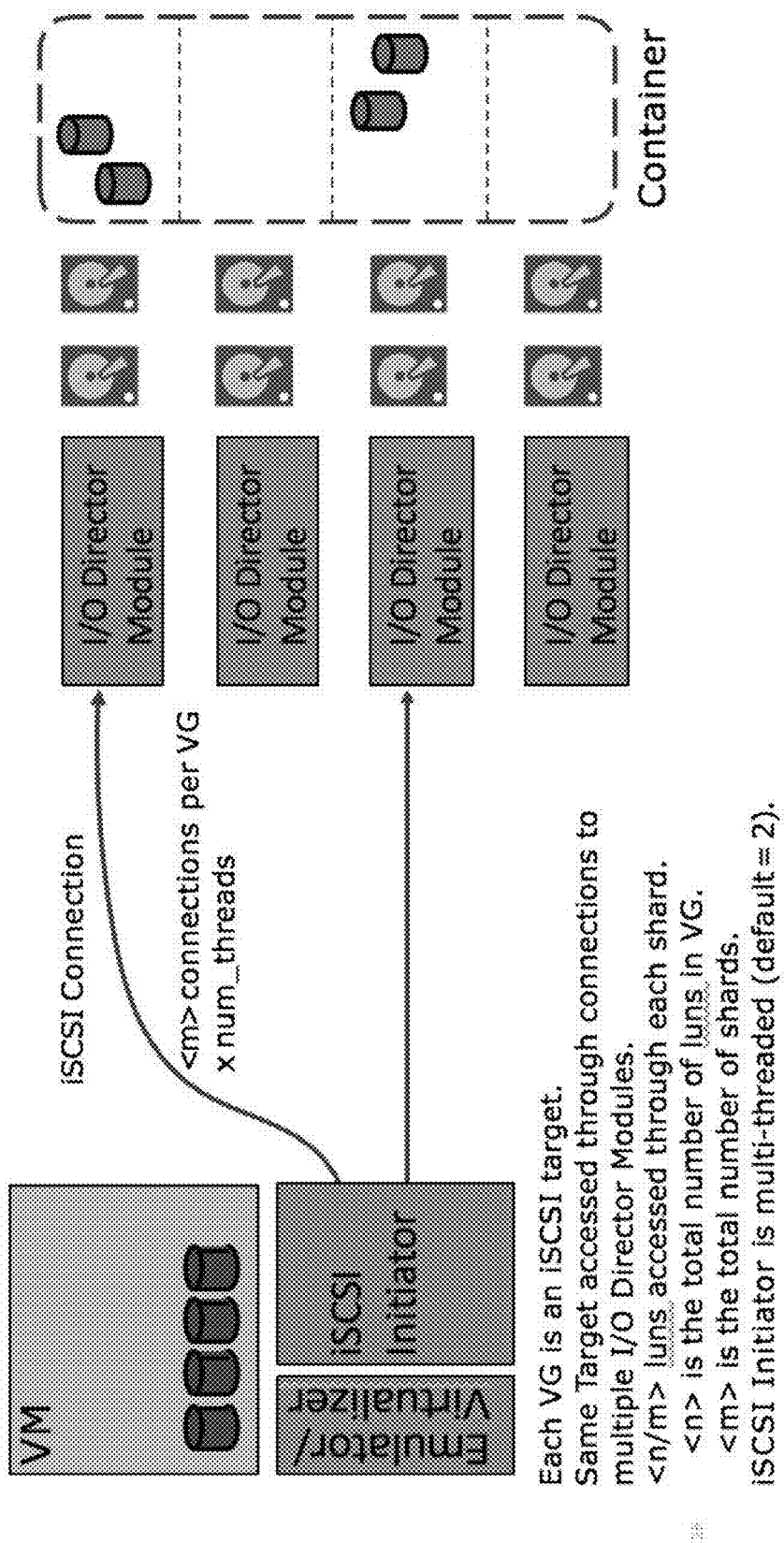
FIG. 2B illustrates a volume group with load balancing according to some embodiments of the invention.

In contrast, FIG. 2B illustrates a volume group with load balancing according to some embodiments of the invention. In FIG. 2B, management of the vDisks of the VG 400 is spread across multiple storage controllers 120. Although each VG 400 is an iSCSI target, as in FIG. 2A, in FIG. 2B, the same iSCSI target is accessed through iSCSI connections to multiple I/O director modules 125 (e.g., via multiple IP addresses). For example, as shown in FIG. 2B, an iSCSI initiator 110, which is an iSCSI client and a component of a hypervisor 105 of a node 100 that supports a VM 130, may establish iSCSI connections with multiple I/O director modules 125. In this example, one I/O director module 125 to which the iSCSI initiator 110 is connected is a component of a storage controller 120 of the same node 100 in which the iSCSI initiator 110 resides and another I/O director module 125 to which the iSCSI initiator 110 is connected is a component of a storage controller 120 of a different node 100. As also shown in FIG. 2B, the number of iSCSI connections that may be established per VG 400 is a function of the total number of shards 140 and the number of threads. Similar to FIG. 2A, the iSCSI initiator 110 is multi-threaded, with a default of 2 threads. Furthermore, in some embodiments, the number of LUNs 145 that may be accessed through each shard 140 may be equal to the total number of LUNs 145 in the VG 400 divided by the total number of shards 140 (e.g., if the VG 400 is partitioned into shards 140 based on a round-robin algorithm, as described below). Thus, all the load balancing is abstracted away by the I/O director module 125 and the iSCSI initiator 110. The load balancing of volume groups that are accessed by iSCSI clients that are outside a clustered virtualization environment is described in U.S. patent application Ser. No. 15/607,202, which is hereby incorporated by reference in its entirety.

Figure 3:
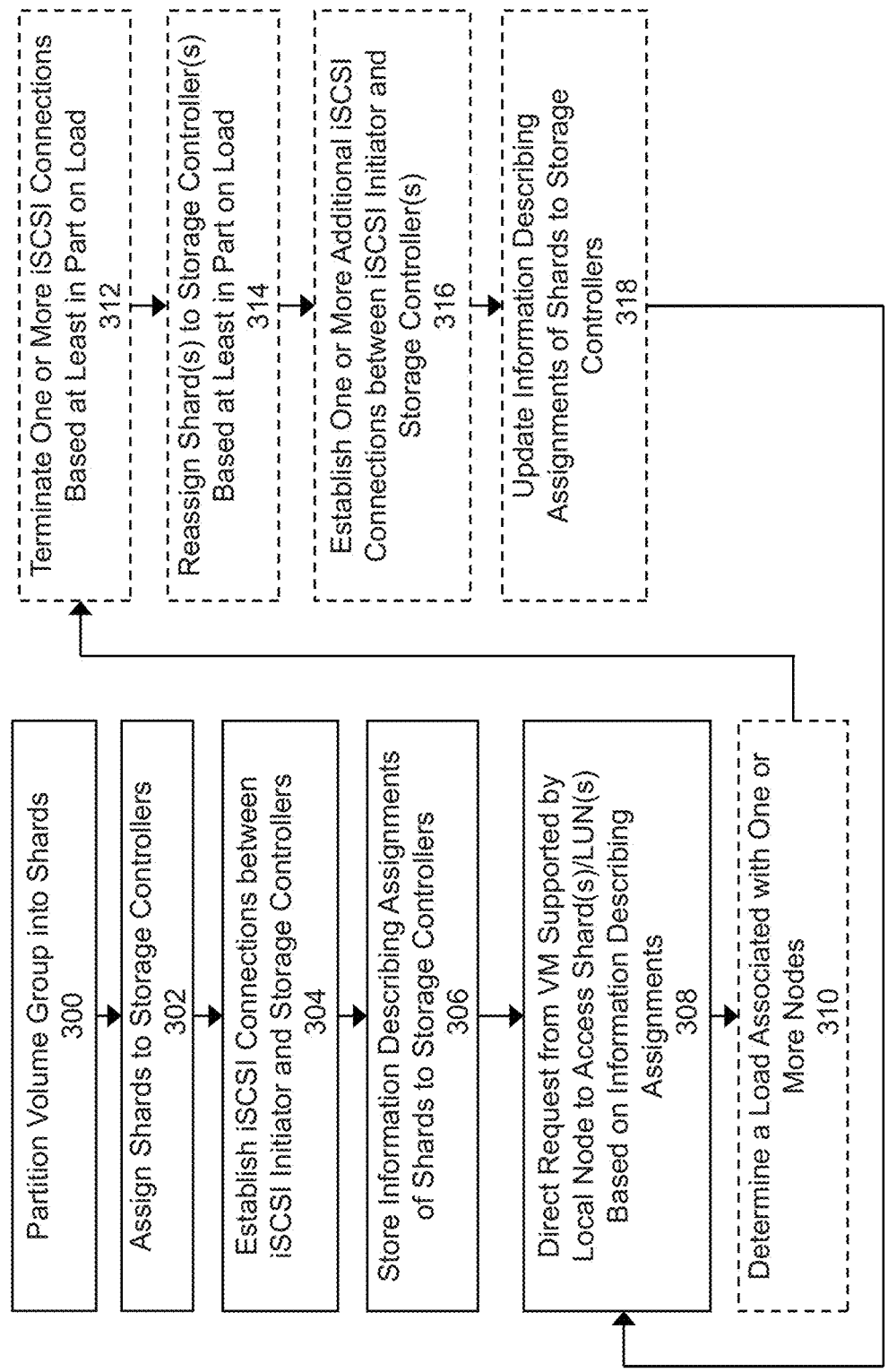
FIG. 3 illustrates a flowchart for achieving hypervisor attached volume group load balancing according to some embodiments of the invention.

FIG. 3 is a flowchart for achieving hypervisor attached volume group load balancing according to some embodiments of the invention. Some of the steps illustrated in the flowchart are optional in different embodiments. In some embodiments, the steps may be performed in an order different from that described in FIG. 3.

As shown in FIG. 3, the flowchart begins when a VG 400 is partitioned into multiple shards 140 (in step 300). As described above, each shard 140 may include one or more LUNs 145 that each correspond to a vDisk comprising the VG 400. The number of shards 140 into which the VG 400 is partitioned may be determined based on the number of nodes 100 included in the clustered virtualization environment, based on the number of LUNs 145 included in the VG 400, and/or based on any other suitable factor. In various embodiments, the number of shards 140 into which the VG 400 is partitioned may be determined by a system administrator and received as an input to the clustered virtualization environment via a management console (described below in conjunction with FIGS. 8 and 9).

Figure 4A:
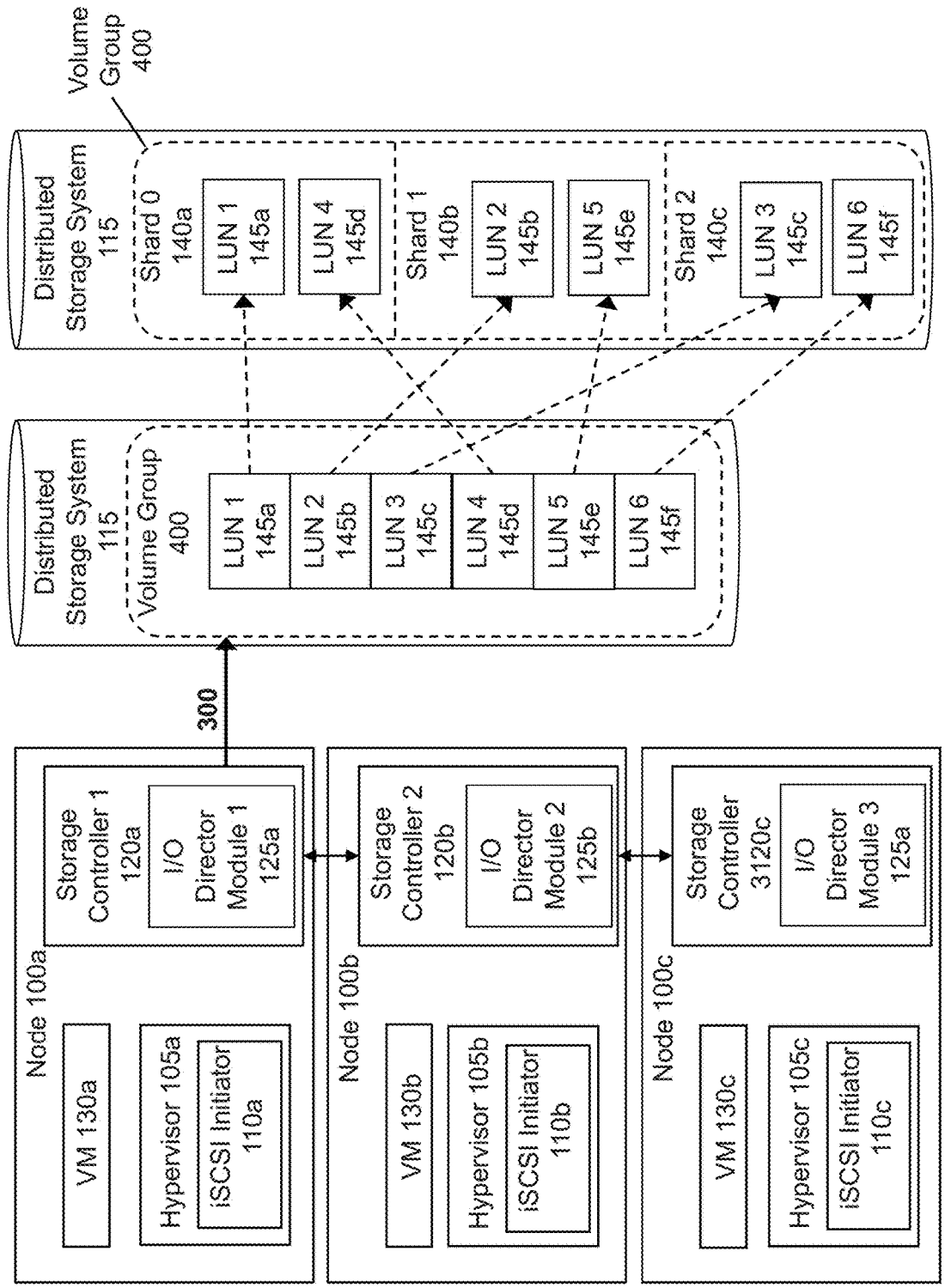
FIGS. 4A-4J illustrate an example of achieving hypervisor attached volume group load balancing according to some embodiments of the invention.

In some embodiments, the VG 400 may be partitioned by an I/O director module 125 of a storage controller 120 of a node 100 in the clustered virtualization environment (e.g., a leader node 100). A VG 400 may be partitioned into shards 140 based at least in part on an algorithm. For example, as shown in FIG. 4A, Storage Controller 1 120a of node 100a may partition a VG 400 into three shards 140a-c based on a round-robin algorithm. In this example, LUNs 145a-f in the VG 400 are partitioned into the three shards 140a-c, such that LUN 1 145a is assigned to Shard 0 140a, LUN 2 145b is assigned to Shard 1 140b, LUN 3 145c is assigned to Shard 2 140c, LUN 4 145d is assigned to Shard 0 140a, LUN 5 145e is assigned to Shard 1 140b, and LUN 6 145f is assigned to Shard 2 140c. In some embodiments, a particular LUN 145 may be accessed by the iSCSI initiator 110 through a shard 140 that may be identified based on the number of shards 140 into which a VG 400 is partitioned and based on a number of LUNs 145 in the VG 400. For example, a particular LUN 145 'i' may be accessed through a shard 140 identified by i % num_shards, where num_shards is equal to the number of shards 140 into which a VG 400 is partitioned.

Figure 4B:
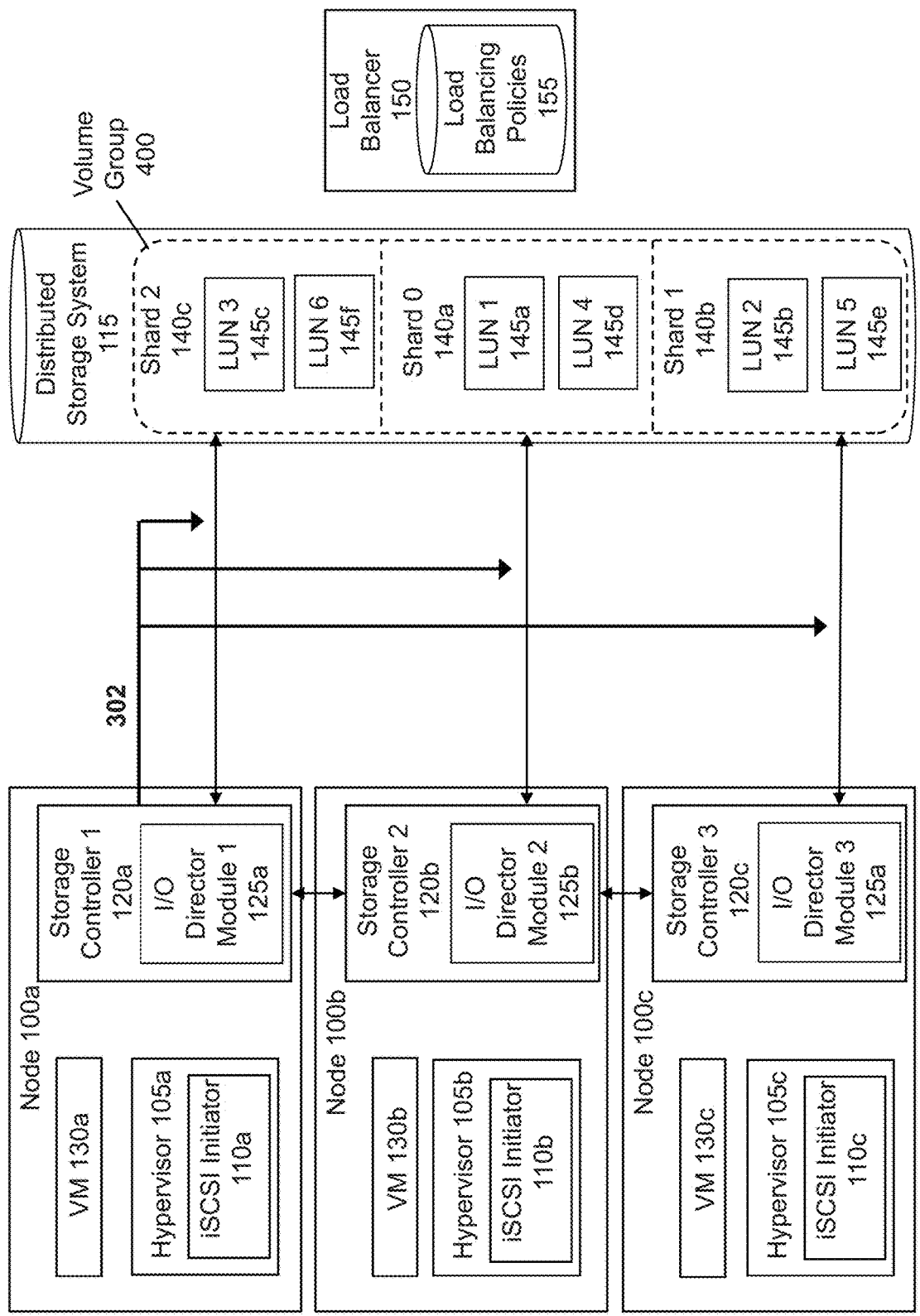

Referring back to FIG. 3, once the VG 400 has been partitioned into shards 140, the shards 140 may be assigned to storage controllers 120 of different nodes 100 of the clustered virtualization environment (in step 302). In various embodiments, the shards 140 may be assigned to storage controllers 120 based on various factors, including a load associated with the nodes 100 and the number of nodes 100 in the clustered virtualization environment. For example, if the load on a first node 100 is 75% (i.e., 75% of the resources available on the first node 100 currently are in use) and the load on a second node 100 is 10% (i.e., 10% of the resources available on the second node 100 currently are in use), more shards 140 may be assigned to the storage controller 120 of the second node 100 than to the storage controller 120 of the first node 100. As an additional example, if a large number of nodes 100 are included in a clustered virtualization environment, fewer shards 140 may be assigned to the storage controller 120 of each node 100 than if a smaller number of nodes 100 are included in the clustered virtualization environment. As shown in the example of FIG. 4B, which continues the example discussed above with respect to FIG. 4A, Storage Controller 1 120a of node 100a may assign Shard 2 140c, Shard 0 140a, and Shard 1 140b and their corresponding LUNs 145a-f to Storage Controller 1 120a, Storage Controller 2 120b, and Storage Controller 3 120c, respectively.

Figure 4C:
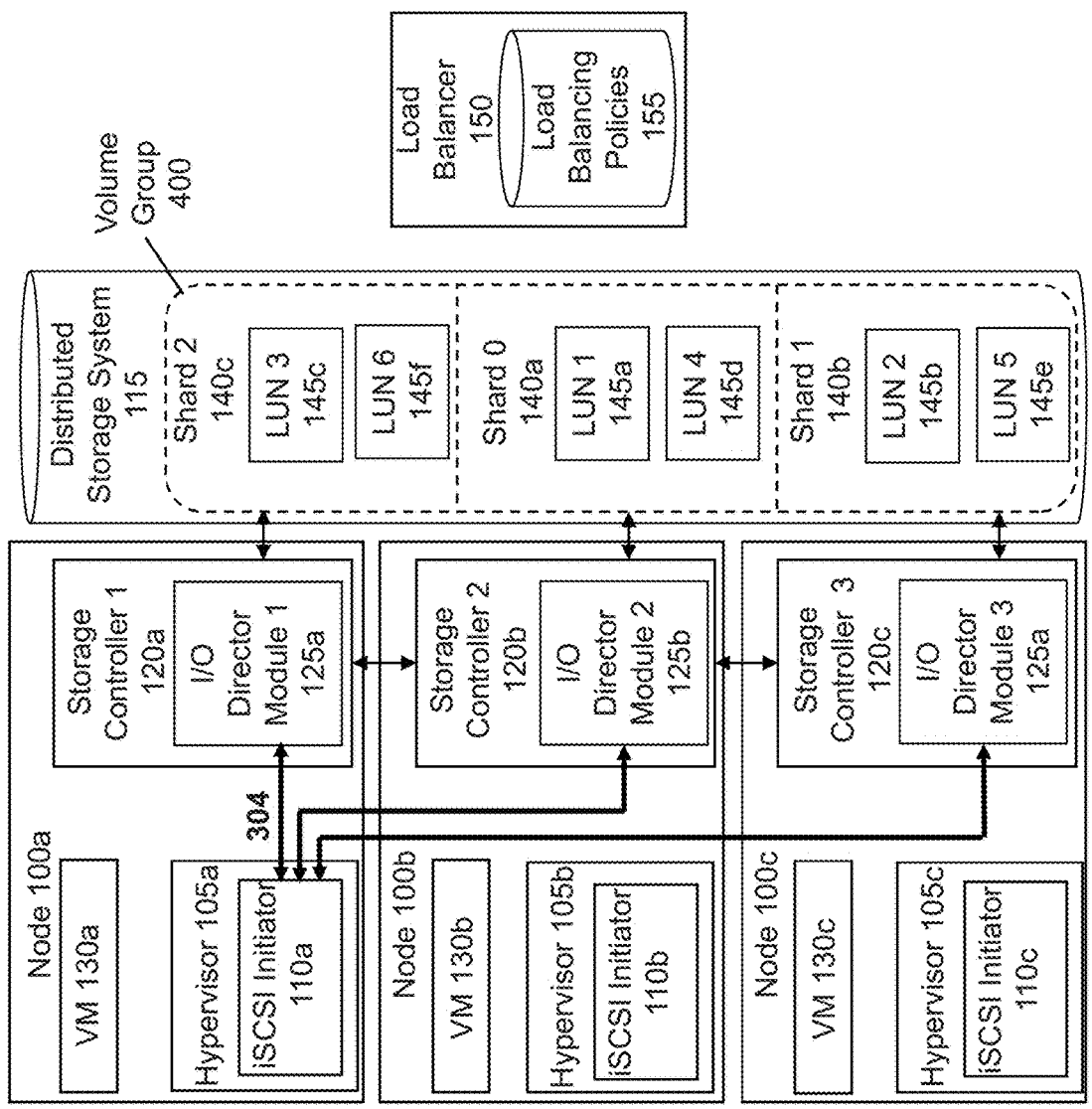

Referring again to FIG. 3, once the shards 140 have been assigned to the storage controllers 120, iSCSI connections may be established between an iSCSI initiator 110 and each of the storage controllers 120 to which the shards 140 have been assigned (in step 304). As described above in conjunction with FIGS. 2A and 2B, each iSCSI connection may be established between an iSCSI initiator 110 and a storage controller 120 via an I/O director module 125 of the storage controller 120. Furthermore, as also described above, the number of iSCSI connections that may be established per VG 400 may be a function of the total number of shards 140 into which the VG 400 has been partitioned. Since the storage controllers 120 coordinate with each other, as described above, when an iSCSI connection is being established between an iSCSI initiator 110 and a storage controller 120, the storage controller 120 may communicate information to the iSCSI initiator 110 about LUN(s) 145/shard(s) 140 assigned to one or more storage controllers 120. For example, as shown in FIG. 4C, which continues the example discussed above with respect to FIGS. 4A-4B, iSCSI initiator 110a of node 100a establishes a first iSCSI connection to Storage Controller 1 120a via I/O Director Module 1 125a, a second iSCSI connection to Storage Controller 2 120b via I/O Director Module 2 125b, and a third iSCSI connection to Storage Controller 3 120c via I/O Director Module 3 125c. In this example, information indicating that Shard 2 140c and its corresponding LUNs 145 (LUN 3 145c and LUN 6 145f) have been assigned to Storage Controller 1 120a and similar information regarding the assignment of Shard 0 140a to Storage Controller 2 120b and Shard 1 140b to Storage Controller 3 120c is communicated to iSCSI initiator 110a. Although the iSCSI connections are shown as being established only between iSCSI initiator 110a and each of the I/O director modules 125a-c, in some embodiments, iSCSI connections also may be established between iSCSI initiators 110b-c of nodes 100b-c and each of the I/O director modules 125a-c as well.

Figure 4D:
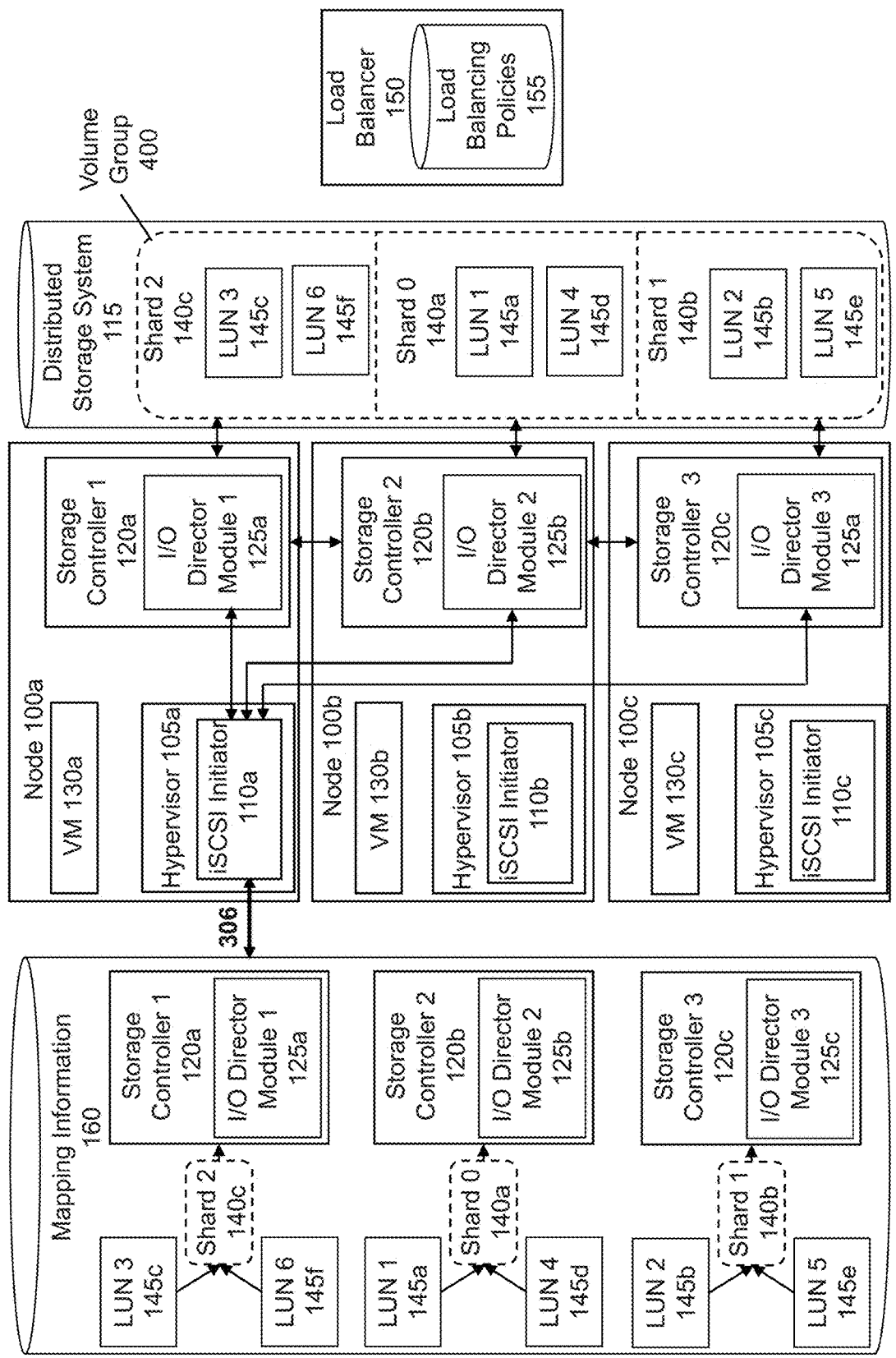

Referring back to FIG. 3, the iSCSI initiator 110 may store information describing the assignments of the shards 140 to the storage controllers 120 (in step 306). In some embodiments, this information may include information describing the LUN(s) 145 assigned to each shard 140. As shown in FIG. 4D, which continues the example discussed above with respect to FIGS. 4A-4C, iSCSI initiator 110a may store the information describing the assignments in a database of mapping information 160. As described above in conjunction with FIG. 1, the mapping information 160 may be used by the iSCSI initiators 110a-c to track the shards 140a-c into which the VG 400 is partitioned and their corresponding LUNs 145a-f to handle requests from VMs 130a-c to access the LUNs 145a-f/shards 140a-c. As illustrated in FIG. 4D, the mapping information 160 includes information mapping each LUN 145a-f to its corresponding shard 140a-c and information mapping each shard 140a-c to the storage controller 120a-c to which the shard 140a-c was assigned. Although FIG. 4D shows only iSCSI initiator 110a storing the mapping information 160, in various embodiments, iSCSI initiators 110b-c of nodes 100b-c also or alternatively may store the mapping information 160. For example, suppose that iSCSI initiator 110b establishes iSCSI connections to I/O Director Module 1 125a, I/O Director Module 2 125b, and I/O Director Module 3 125c. In this example, iSCSI initiator 110b also may store the mapping information 160 illustrated in FIG. 4D.

Figure 4E:
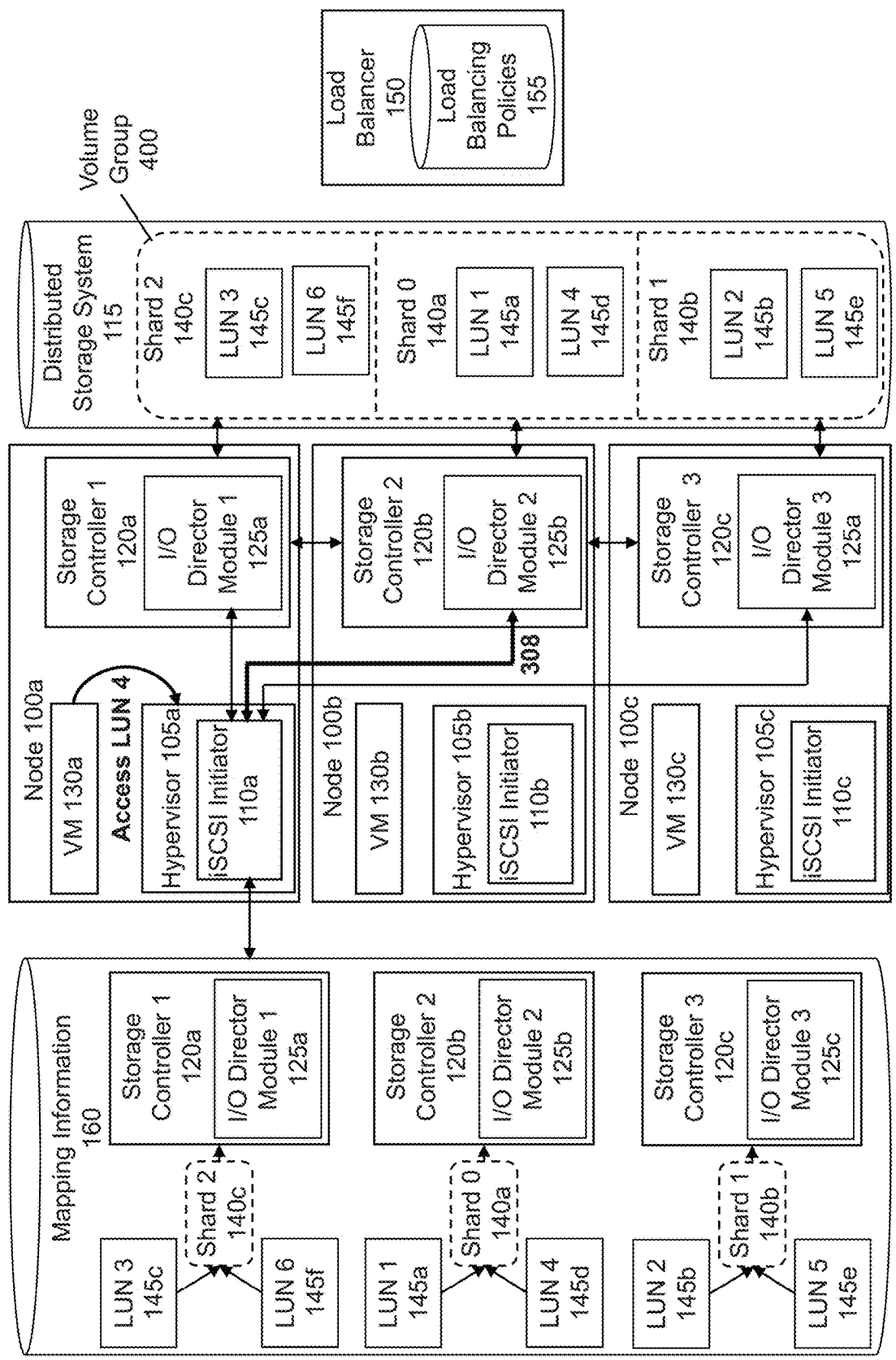

Referring now to FIG. 3, upon receiving a request to access one or more LUNs 145/shards 140 from a VM 130 supported by a local node 100 in the clustered virtualization environment, the iSCSI initiator 110 of the local node 100 may direct the request to one or more storage controllers 120 to which the LUN(s) 145/shard(s) 140 have been assigned based at least in part on the information describing the assignments (in step 308). The local iSCSI initiator 110 may do so by accessing the mapping information 160 and identifying the storage controller 120 to which each shard 140/LUN 145 indicated in the request was assigned. For example, as shown in FIG. 4E, which continues the example discussed above with respect to FIGS. 4A-4D, when hypervisor 105a of node 100a receives a request from VM 130a to access LUN 4 145d, iSCSI initiator 110a accesses the mapping information 160 to identify the shard 140a-c that includes LUN 4 145d. In this example, since the mapping information 160 indicates that LUN 4 145d is included in Shard 0 140a, iSCSI initiator 110a identifies the storage controller 120 to which Shard 0 140a was assigned as Storage Controller 2 120b. Continuing with this example, iSCSI initiator 110a may then determine that the request to access LUN 4 145d should be directed to I/O Director Module 2 125b (the I/O director module 125 of Storage Controller 2 120b) and may direct the request to the appropriate iSCSI connection. Although FIG. 4E shows only hypervisor 105a of node 100a receiving a request from VM 130a to access a LUN 145a-f and iSCSI initiator 110a accessing the mapping information 160 to identify the shard 140a-c that includes the specified LUN 145a-f, in some embodiments, hypervisors 105b-c of nodes 100b-c may receive requests from VMs 130b-c to access a LUN 145a-f. In such embodiments, iSCSI initiators 110b-c also may access the mapping information 160 and direct the request based at least in part on the mapping information 160 in a similar manner.

Figure 4F:
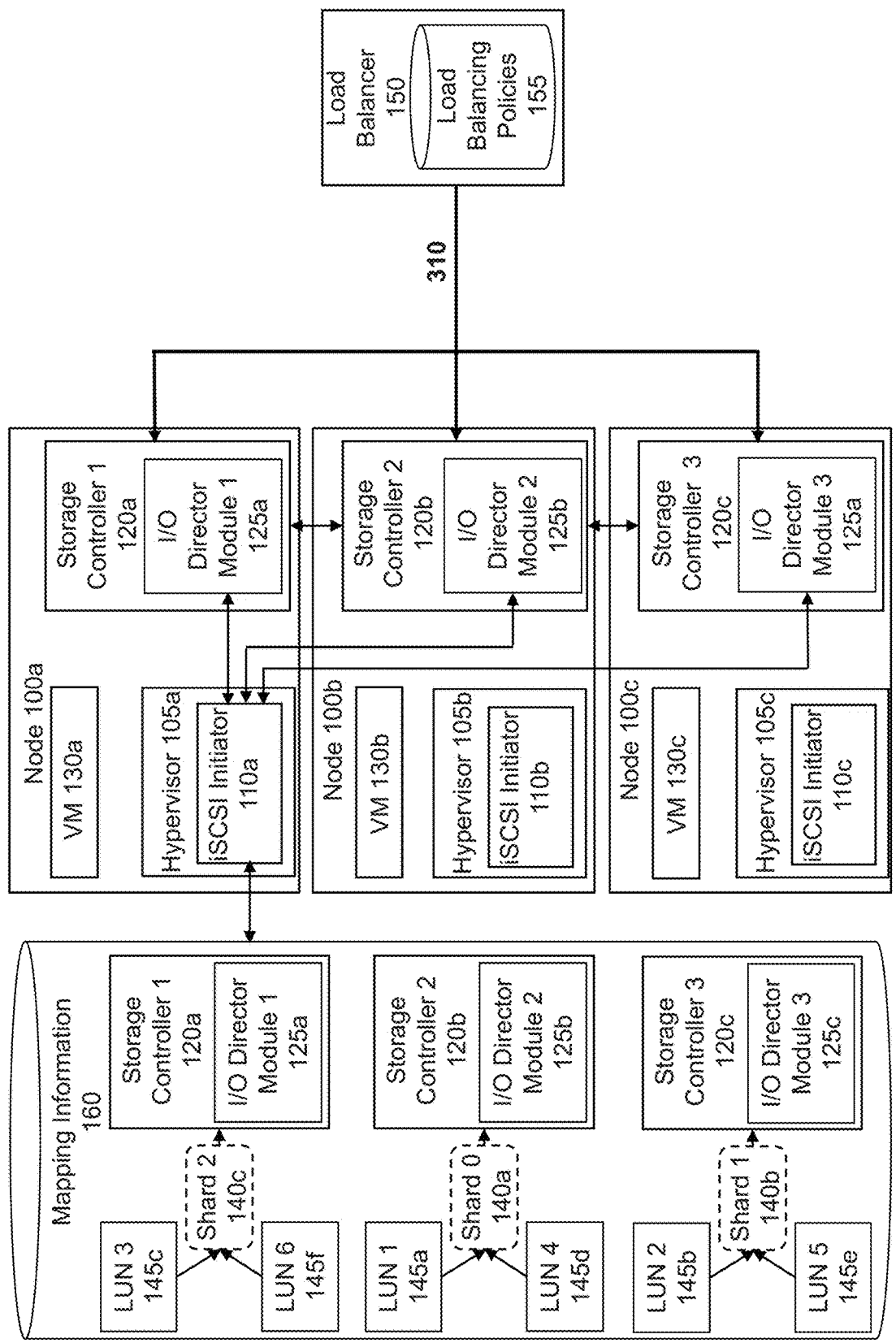

Referring back to FIG. 3, in some embodiments, as requests received from one or more VMs 130 supported by the local node 100 are directed to storage controllers 120 of different nodes 100 within the clustered virtualization environment, the loads being handled by one or more of the nodes 100 may be determined (e.g., periodically or based on a triggering event) by the load balancer 150 (in step 310). An example of this is illustrated in FIG. 4F, which continues the example discussed above with respect to FIGS. 4A-4E. In various embodiments, the loads may be determined by the load balancer 150 based on various factors indicating the usage of resources of each node 100a-c (e.g., based on a minimum latency required for the workloads supported by the nodes 100a-c, based on the types of applications being used by the VMs 130a-c supported by the nodes 100a-c, based on the number of VMs 130a-c supported by the nodes 100a-c, etc.). Based on the load and one or more load balancing policies 155 applied to the VG 400, one or more of the shards 140 and their corresponding iSCSI connections may be moved to different storage controllers 120a-c and I/O director modules 125a-c to more evenly distribute the load across the cluster of nodes 100, as described above.

Figure 4G:
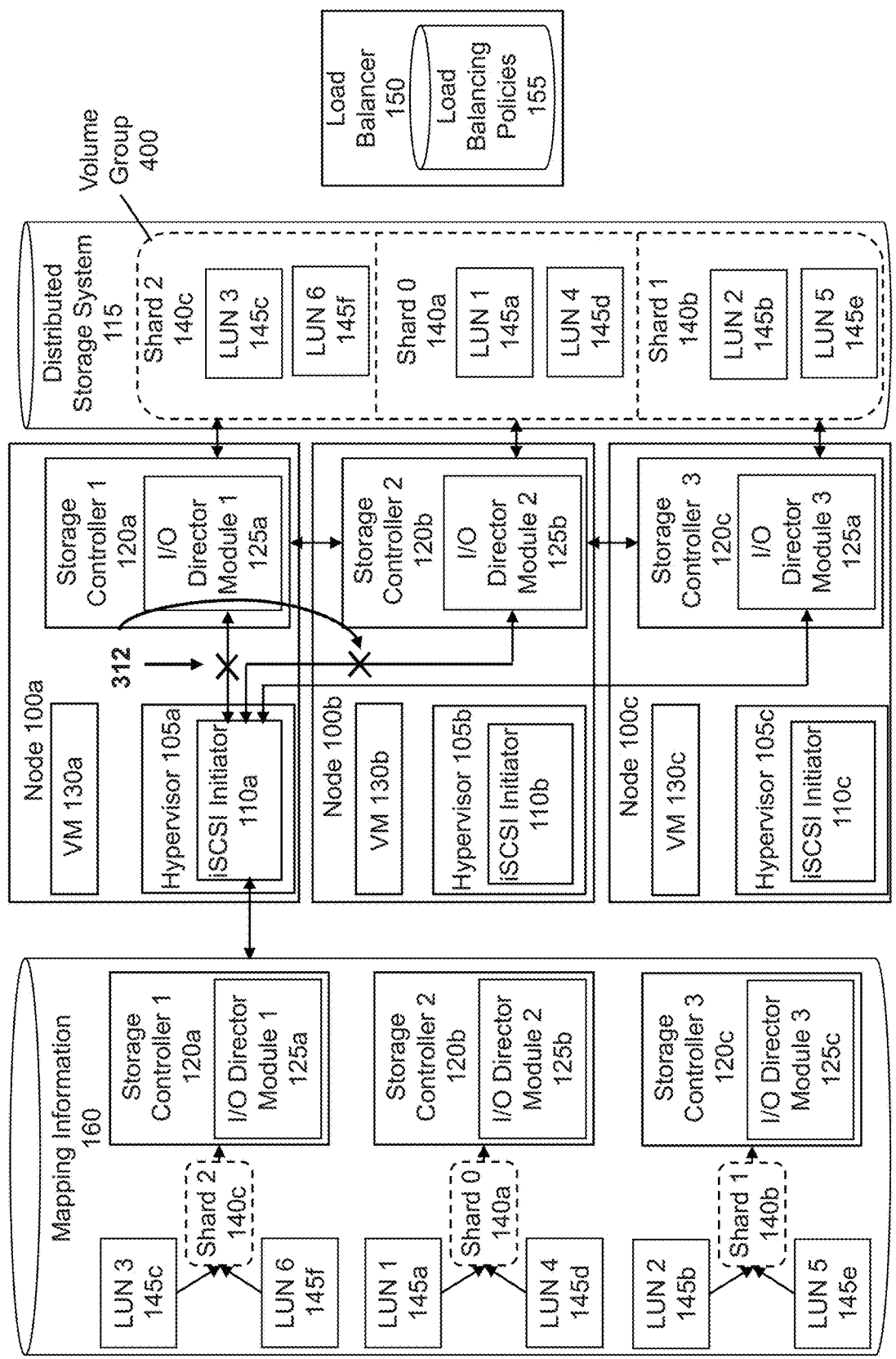

Referring again to FIG. 3, to move the shards 140 and their corresponding iSCSI connections, one or more iSCSI connections may be terminated based on the loads being handled by one or more of the nodes 100 (in step 312). In some embodiments, an iSCSI connection may be terminated between an iSCSI initiator 110 and an I/O director module 125 of a storage controller 120 of one or more nodes 100 if the nodes 100 have relatively large or small loads. For example, as shown in FIG. 4G, which continues the example discussed above with respect to FIGS. 4A-4F, suppose that the load balancer 150 determines that the highest load is being handled by node 100a, in which the majority of the requests being processed involved requests to access LUN 3 145c and that the lowest load is being handled by node 100b, in which the fewest requests being processed involved requests to access LUN1 145a. In this example, the iSCSI connection between iSCSI initiator 110a and I/O Director Module 1 125a and the iSCSI connection between iSCSI initiator 110a and I/O Director Module 2 125 b may be terminated.

Figure 4H:
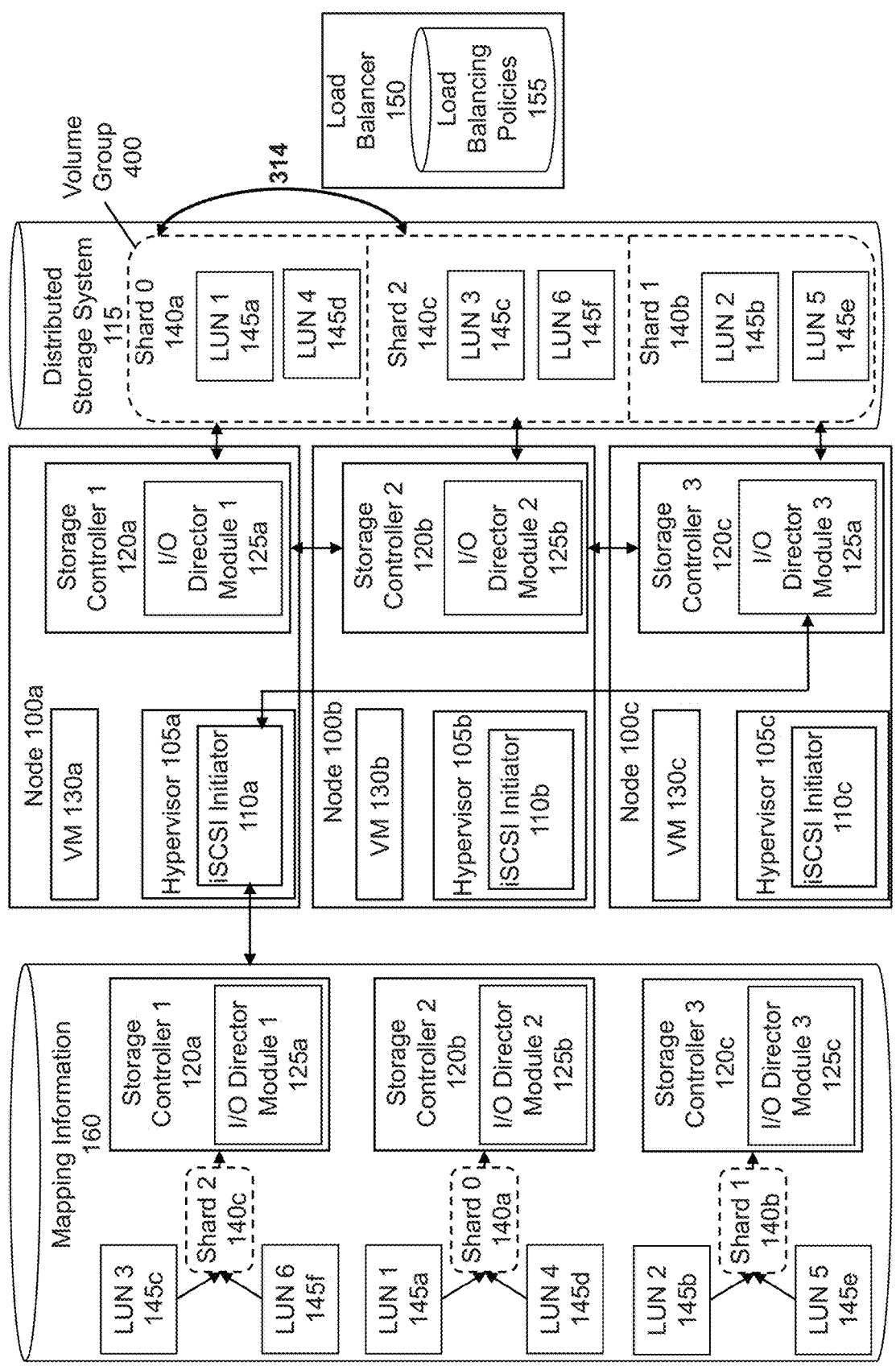

Referring back to FIG. 3, once one or more iSCSI connections have been terminated, based on the loads being handled by one or more of the nodes 100, one or more shards 140 may be reassigned to one or more storage controllers 120 (in step 314). In some embodiments, the shards 140 may be reassigned to storage controllers 120 based on one or more load balancing policies 155 to more evenly distribute the loads across the nodes 100 of the clustered virtualization environment. For example, as shown in FIG. 4H, which continues the example discussed above with respect to FIGS. 4A-4G, since the load balancer 150 determined that the highest load is being handled by node 100a, in which the majority of the requests being processed involved requests to access LUN 3 145c and that the lowest load is being handled by node 100b, in which the fewest requests being processed involved requests to access LUN 1 145a, the load balancer 150 may reassign Shard 0 140a and Shard 2 140c, which include LUN 1 145a and LUN 3 145c, respectively, based on one or more load balancing policies 155. Continuing with this example, the load balancer 150 may reassign Shard 0 140a to Storage Controller 1 120a and Shard 2 140c to Storage Controller 2 120b to more evenly distribute the loads across the nodes 100a-c of the clustered virtualization environment.

Figure 4I:
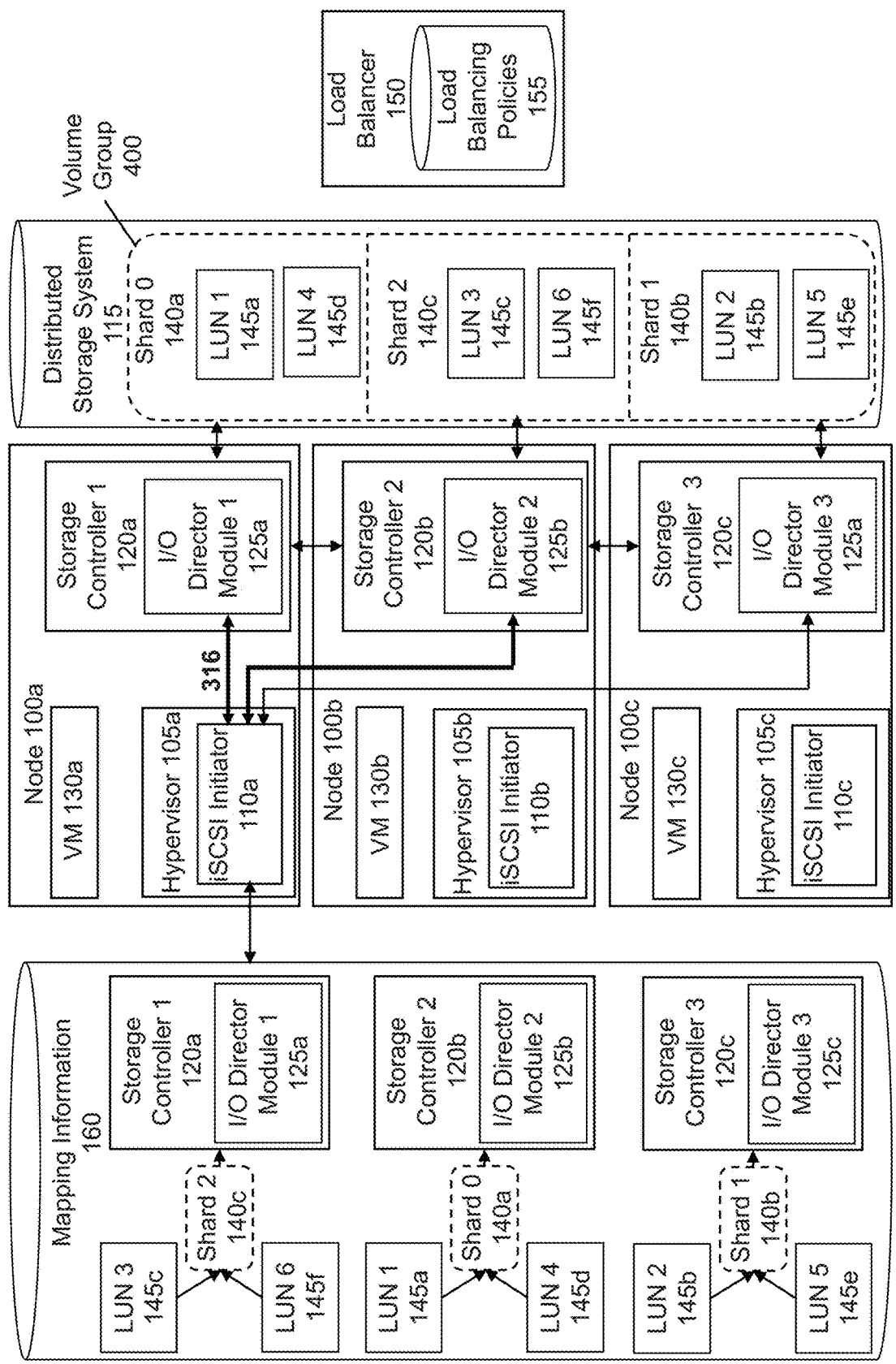

Referring again to FIG. 3, in response to the reassignment of the shards 140 to the storage controllers 120, one or more iSCSI connections may be established between the iSCSI initiator 110 and the storage controllers 120 (via their respective I/O director modules 125) (in step 316). Similar to step 304, when an iSCSI connection is being established between an iSCSI initiator 110 and a storage controller 120, information about the LUN(s) 145/shard(s) 140 reassigned to one or more storage controllers 120 may be communicated to the iSCSI initiator 110. For example, as shown in FIG. 4I, which continues the example discussed above with respect to FIGS. 4A-4H, since the load balancer 150 reassigned Shard 0 140a to Storage Controller 1 120a and Shard 2 140c to Storage Controller 2 120b, iSCSI initiator 110a may establish iSCSI connections to I/O Director Module 1 125a and I/O Director Module 2 125b. In this example, information about the reassignment of Shard 0 140a to Storage Controller 1 and the reassignment of Shard 2 140c to Storage Controller 2 120b may be communicated to iSCSI initiator 110a.

Figure 4J:
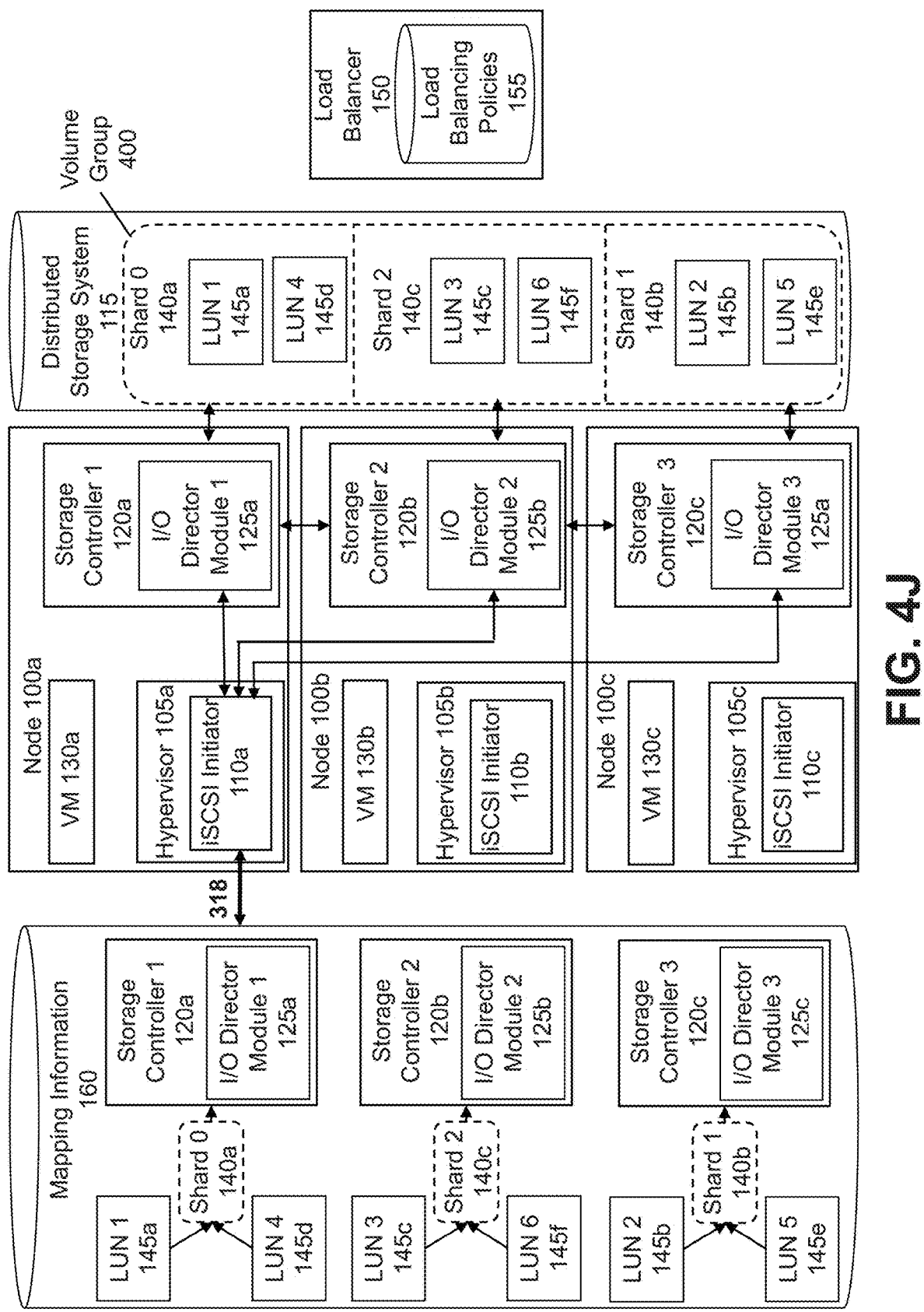

Referring back to FIG. 3, once iSCSI connections have been established between the iSCSI initiator 110 and one or more storage controllers 120 in response to the reassignment of the shards 140, information describing the reassignments may be updated (in step 318). For example, as shown in FIG. 4J, which continues the example discussed above with respect to FIGS. 4A-4I, since iSCSI initiator 110a has established iSCSI connections to I/O Director Module 1 125a and I/O Director Module 2 125b, iSCSI initiator 110a may update the mapping information 160 to reflect the reassignment of Shard 0 140a and its corresponding LUNs 145 (LUN 1 145a and LUN 4 145d) to Storage Controller 1 120a and the reassignment of Shard 2 140c and its corresponding LUNs 145 (LUN 3 145c and LUN 6 145f) to Storage Controller 2 120b. In various embodiments, if one or more of the shards 140 and their corresponding iSCSI connections are moved to different storage controllers 120 to more evenly distribute the load across the cluster of nodes 100, requests from a VM 130 supported by the local node 100 may not be directed to storage controllers 120 of any nodes 100 until information describing the reassignments (e.g., stored in the mapping information 160) has been updated. For example, processing of a request from a VM 130 supported by a node 100 may be suspended until the mapping information 160 is updated to reflect any reassignments of LUNs 145/shards 140 to different storage controllers 120.

Referring once more to FIG. 3, in some embodiments, one or more of the steps of the flowchart described above may be repeated. For example, upon receiving an additional request from a VM 130 supported by the local node 100 to access one or more LUNs 145/shards 140, the iSCSI initiator 110 of the local node 100 may direct the request to an appropriate storage controller 120 of a node 100 in the clustered virtualization environment (in step 308). One or more of the steps of the flowchart described above also may be repeated in embodiments in which nodes 100 are added or removed from the clustered virtualization environment. For example, if new nodes 100 are added, the VG 400 may be partitioned (in step 300), and the shards 140 assigned to the storage controllers 120 and the iSCSI connections established between the iSCSI initiator 110 of the hypervisor 105 and the I/O director modules 125 of the storage controllers 120 (in steps 302 and 304), allowing a VM 130 supported by a local node 100 to access shards 140 via storage controllers 120 of the original nodes 100 and the new nodes 100. Similarly, if nodes 100 are removed from the clustered virtualization environment, the VG 400 may be partitioned (in step 300), and the shards 140 assigned to the storage controllers 120 and the iSCSI connections established between the iSCSI initiator 110 of the hypervisor 105 and the I/O director modules 125 of the storage controllers 120 (in steps 302 and 304), allowing a VM 130 supported by a local node 100 to access shards 140 via storage controllers 120 of the remaining nodes 100. Therefore, node 100 additions, removals, and the like will be handled in a manner that is transparent to the VM 130. Thus, load balancing is handled entirely by the iSCSI initiators 110 and the I/O director modules 125 of the storage controllers 120 in the clustered virtualization environment.

Figure 5:
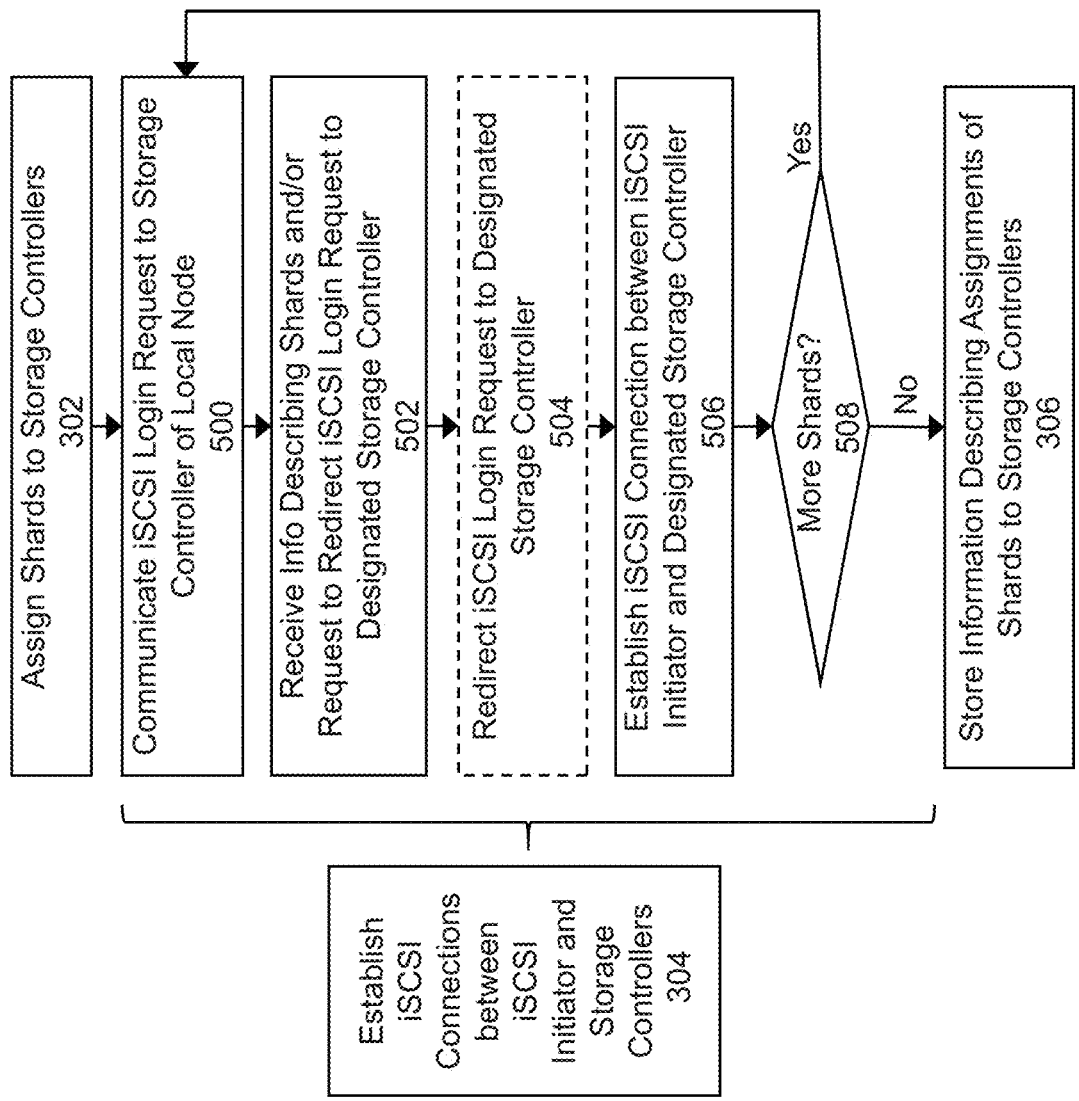
FIG. 5 illustrates a flowchart for establishing iSCSI connections between an iSCSI initiator and storage controllers according to some embodiments of the invention.

FIG. 5 is a flowchart for establishing iSCSI connections between an iSCSI initiator and storage controllers according to some embodiments of the invention. In some embodiments, the steps may be performed in an order different from that described in FIG. 5.

As shown in FIG. 5, the flowchart begins when shards 140 comprising a VG 400 are assigned to storage controllers 120 of different nodes 100 of the clustered virtualization environment (in step 302). As described above in conjunction with FIG. 3, the shards 140 may be assigned to storage controllers 120 based on various factors (e.g., a load associated with each of the nodes 100 and the number of nodes 100 in the clustered virtualization environment). As also described above, once the shards 140 have been assigned to the storage controllers 120, iSCSI connections may be established between the iSCSI initiator 110 of a local node 100 (i.e., a node 100 that supports one or more VMs 130 from which requests to access the shards 140/LUNs 145 may originate) and the storage controllers 120 via the I/O director modules 125 of each of the storage controllers 120 (in step 304).

Figure 6:
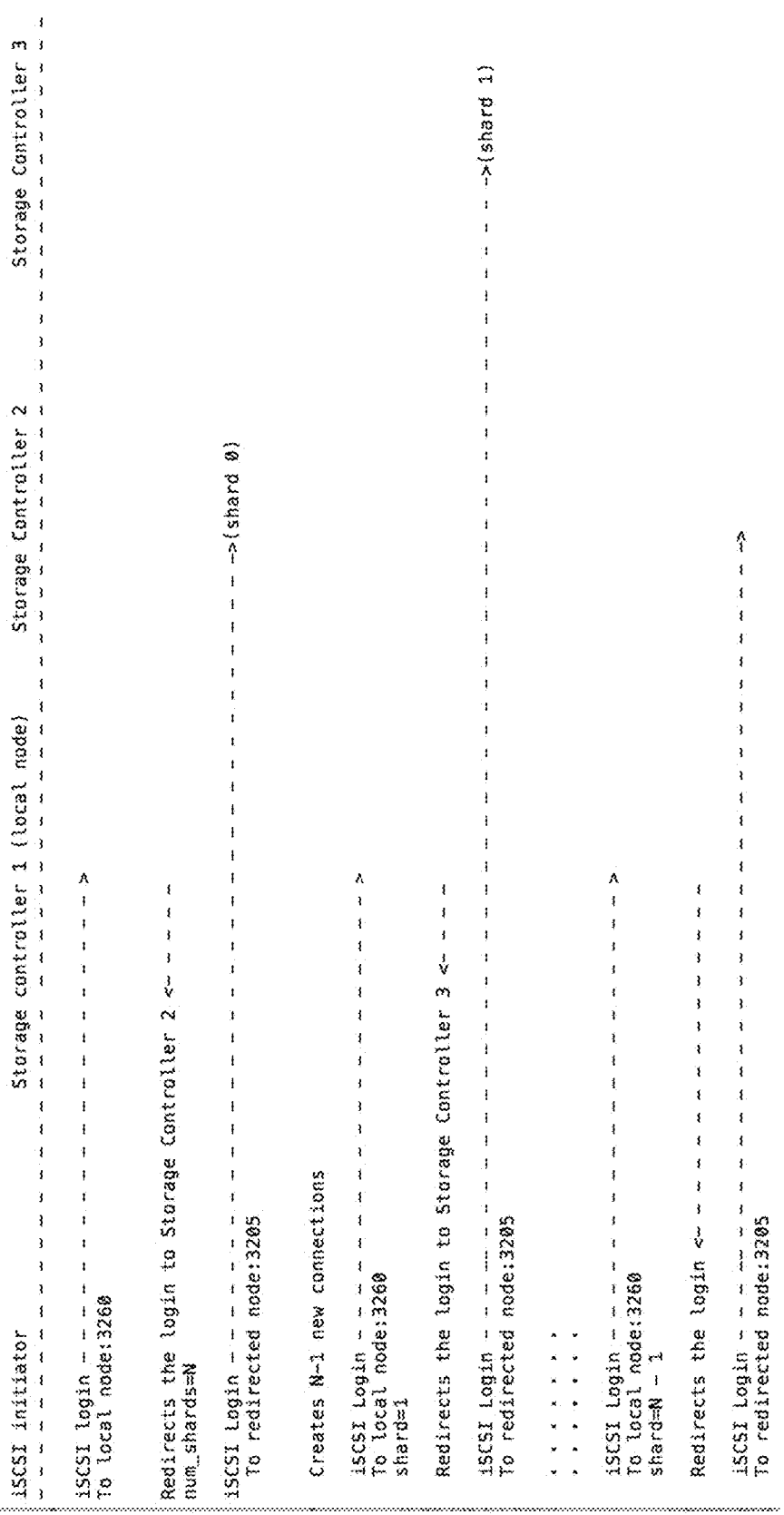
FIG. 6 illustrates a protocol for establishing iSCSI connections according to some embodiments of the invention.

To establish the iSCSI connections between the iSCSI initiator 110 of the local node 100 and the storage controllers 120, the iSCSI initiator 110 communicates with the storage controller 120 of the local node 100 on behalf of a VM 130 supported by the local node 100. During an iSCSI login phase, information describing the shards 140 and the assignments of the shards 140 to the storage controllers 120 may be communicated between the I/O director modules 125 and the iSCSI initiator 110 (e.g., using custom key-value pair exchange). Specifically, the iSCSI initiator 110 first issues/communicates an iSCSI login request to the storage controller 120 of the local node 100 via the I/O director module 125 of the storage controller 120 (in step 500). In response to this request, the iSCSI initiator 110 may receive information from the I/O director module 125 describing the shards 140 (e.g., the number of shards 140) included in the VG 400 and/or a request to redirect the iSCSI login request to a designated storage controller 120 (in step 502). In some embodiments, the iSCSI initiator 110 may only receive the information describing the shards 140 (e.g., if an iSCSI connection may be established between the iSCSI initiator 110 and the I/O director module 125 of the storage controller 120). For example, as shown in FIG. 6, an iSCSI login request is sent from the iSCSI initiator 110 to Storage Controller 1 120a, which is the storage controller 120 of the local node 100. In response to the request, the iSCSI initiator 110 receives information from Storage Controller 1 120a describing the number of shards 140 (num_shards=N) and a request to redirect the iSCSI login request to the storage controller 120 of a different node 100 (i.e., Storage Controller 2 120b). In the example of FIG. 6, if the first shard 140 (Shard 0 140a) had instead been assigned to Storage Controller 1 120a, the iSCSI initiator 110 may have received only the information describing the number of shards 140 comprising the VG 400 in response to communicating the iSCSI login request to Storage Controller 1 120a since the iSCSI login request would not have needed to be redirected to the storage controller 120 of a different node 100. In embodiments in which the iSCSI initiator 110 receives a request to redirect the iSCSI login request to the storage controller 120 of a different node 100, the storage controller 120 may be selected so as to distribute the load evenly across the nodes 100 in the clustered virtualization environment (e.g., based on one or more load balancing policies 155).

Referring back to FIG. 5, in embodiments in which the iSCSI initiator 110 receives information describing the shards 140 and a request to redirect the iSCSI login request to a designated storage controller 120, the iSCSI initiator 110 may redirect the iSCSI login request to the designated storage controller 120 (in step 504). In some embodiments, the request to redirect the iSCSI login request may include information identifying a shard 140 associated with an iSCSI connection to be established (i.e., a shard 140 that may be accessed via the iSCSI connection to be established). An iSCSI connection may then be established between the iSCSI initiator 110 and the designated storage controller 120 for the first shard 140 via the I/O director module 125 of the designated storage controller 120 (in step 506). For example, as shown in FIG. 6, since the iSCSI initiator 110 received a request to redirect the iSCSI login request to Storage Controller 2 120b, the iSCSI initiator 110 may redirect the iSCSI login request to Storage Controller 2 120b. This request includes information identifying the first shard 140 (i.e., a parameter indicating the shard number to be Shard 0 140a). An iSCSI connection may then be established between the iSCSI initiator 110 and Storage Controller 2 120b that would allow a request originating from a VM 130 supported by the local node 100 to access the first shard 140 (Shard 0 140a) to be directed to Storage Controller 2 120b and processed. In embodiments in which the iSCSI initiator 110 does not receive a request to redirect the iSCSI login request from the storage controller 120 of the local node 100, the iSCSI connection may be established between the iSCSI initiator 110 and the storage controller 120 of the local node 100 via the I/O director module 125 of the storage controller 120. In the above example, if the iSCSI initiator 110 had not received the request to redirect the iSCSI login request to Storage Controller 2 120b, an iSCSI connection may have been established between the iSCSI initiator 110 and Storage Controller 1 120a of the local node 100.

Referring again to FIG. 5, after an iSCSI connection is established for a particular shard 140, the iSCSI initiator 110 may determine whether there are any additional shards 140 for which iSCSI connections must be established (in step 508). The iSCSI initiator 110 may make this determination by comparing the number of established connections to the number of shards 140 indicated in the information describing the shards 140 received in step 502. In response to determining that there are additional shards 140 comprising the VG 400, additional iSCSI connections may be established by repeating step 500, as described above. For example, as shown in FIG. 6, once the iSCSI connection has been established for the first shard 140 (Shard 0 140a), since there are N shards 140 in the VG 400, N-1 new connections must be established. Continuing with this example, an iSCSI login request is communicated from the iSCSI initiator 110 to the I/O director module 125 of the storage controller 120 of the local node 100 (Storage Controller 1 120a) (in step 500). In this example, the request includes information identifying a shard 140 associated with the iSCSI connection to be established by including the shard number as a parameter (i.e., Shard 1 140b). Based on the shard number, the I/O director module 125 of the storage controller 120 of the local node 100 may determine the storage controller 120 to which the identified shard 140 has been assigned. The iSCSI initiator 110 then receives a request from the I/O director module 125 to redirect the iSCSI login request to the appropriate storage controller 120 (in step 502). In the example of FIG. 6, the storage controller 120 to which the request to redirect the iSCSI login request for Shard 1 140b is Storage Controller 3 120c. Continuing with this example, the iSCSI initiator 110 may redirect the iSCSI login request to Storage Controller 3 120c (in step 504) and an iSCSI connection may then be established between the iSCSI initiator 110 and Storage Controller 3 120c for Shard 1 140b via the I/O director module 125c of Storage Controller 3 120c (in step 506). The same steps are repeated for each shard 140 until the remainder of the N-1 iSCSI connections have been established.

Referring once more to FIG. 5, once N-1 iSCSI connections have been established and the iSCSI initiator 110 determines that there are no more shards 140 comprising the VG 400 for which iSCSI connections have not been established, the iSCSI initiator 110 may store information describing the assignments of the shard(s) 140/LUN(s) 145 to the corresponding storage controllers 120 (e.g., in the mapping information 160 in step 306). In some embodiments, rather than storing information describing the assignments after the iSCSI initiator 110 determines that there are no more shards 140 in the VG 400 for which iSCSI connections have not been established, the iSCSI initiator 110 may store information describing the assignments in conjunction with the establishment of each iSCSI connection. For example, after each iSCSI connection is established with a storage controller 120, the iSCSI initiator 110 may store information describing the shard(s) 140 assigned to the storage controller 120 in the mapping information 160 before establishing another iSCSI connection.

In some embodiments, steps 500 through 508 of FIG. 5 also may be used to describe step 316 of FIG. 3. In such embodiments, rather than beginning when shards 140 are assigned to the storage controllers 120 of nodes 100 in the clustered virtualization environment (in step 302), the flow chart begins when one or more shards 140 have been reassigned to one or more storage controllers 120 of nodes 100 in the clustered virtualization environment (in step 314). Similarly, when the iSCSI initiator 110 determines that there are no more shards 140 comprising the VG 400 for which iSCSI connections have not been established, rather than storing information describing the assignments of the shard(s) 140/LUN(s) 145 to the corresponding storage controllers 120 (e.g., in the mapping information 160 in step 306), the iSCSI initiator 100 may update the mapping information 160 to include the reassignments of the shard(s) 140/LUN(s) 145 to the corresponding storage controllers 120 (in step 318).

Figure 7A:
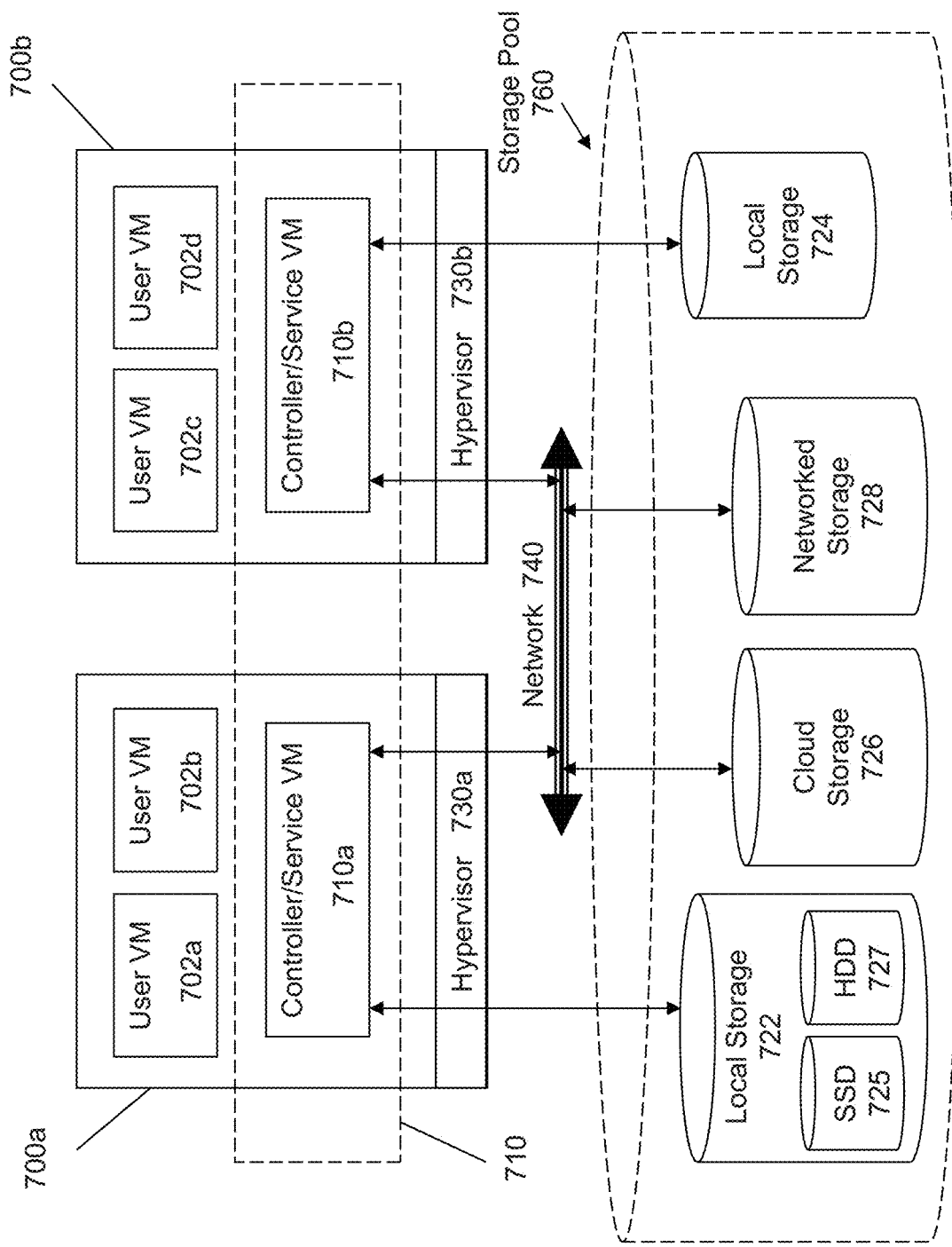
FIG. 7A illustrates an example networked virtualization system according to some embodiments of the invention.

FIG. 7A illustrates a networked virtualization environment in which some embodiments are implemented. In some embodiments, the approach for achieving hypervisor attached volume group load balancing may operate in a networked virtualization environment.

The architecture of FIG. 7A can be implemented for a distributed platform that contains multiple servers 700a and 700b that manages multiple-tiers of storage. The multiple tiers of storage may include storage that is accessible through a network 740, such as cloud storage 726 or networked storage 728 (e.g., a SAN or "storage area network"). Unlike the prior art, the present embodiment also permits local storage 722/724 that is within or directly attached to the server and/or appliance to be managed as part of the storage pool 760. Examples of such storage include Solid State Drives (henceforth "SSDs") 725 or Hard Disk Drives (henceforth "HDDs" or "spindle drives") 727. These collected storage devices, both local and networked, form a storage pool 760. Virtual disks (or "vDisks") can be structured from the storage devices in the storage pool 760, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each server 700a or 700b runs virtualization software, such as VMware ESX(i), Microsoft Hyper-V, or RedHat KVM. The virtualization software includes a hypervisor 730a/730b to manage the interactions between the underlying hardware and the one or more user VMs 702a, 702b, 702c, and 702d that run client software.

A special VM 710a/710b is used to manage storage and I/O activities according to some embodiment of the invention, which is referred to herein as a "Controller/Service VM." This is the "Storage Controller" in the currently described architecture. Multiple such storage controllers coordinate within a cluster to form a single system. The Controller/Service VMs 710a/710b are not formed as part of specific implementations of hypervisors 730a/730b. Instead, the Controller/Service VMs run as virtual machines above hypervisors 730a/730b on the various servers 700a and 700b, and work together to form a distributed system 710 that manages all the storage resources, including the locally attached storage 722/724, the networked storage 728, and the cloud storage 726. Since the Controller/Service VMs run above the hypervisors 730a/730b, this means that the current approach can be used and implemented within any virtual machine architecture, since the Controller/Service VMs of embodiments of the invention can be used in conjunction with any hypervisor from any virtualization vendor.

Each Controller/Service VM 710a-b exports one or more block devices or NFS server targets that appear as disks to the client VMs 702a-d. These disks are virtual, since they are implemented by the software running inside the Controller/Service VMs 710a-b. Thus, to the user VMs 702a-d, the Controller/Service VMs 710a-b appear to be exporting a clustered storage appliance that contains some disks. All user data (including the operating system) in the client VMs 702a-d resides on these virtual disks.

Significant performance advantages can be gained by allowing the virtualization system to access and utilize local (e.g., server-internal) storage 722 as disclosed herein. This is because I/O performance is typically much faster when performing access to local storage 722 as compared to performing access to networked storage 728 across a network 740. This faster performance for locally attached storage 722 can be increased even further by using certain types of optimized local storage devices, such as SSDs 725. Further details regarding methods and mechanisms for implementing the virtualization environment illustrated in FIG. 7A are described in U.S. Pat. No. 8,601,473, which is hereby incorporated by reference in its entirety.

Figure 7B:
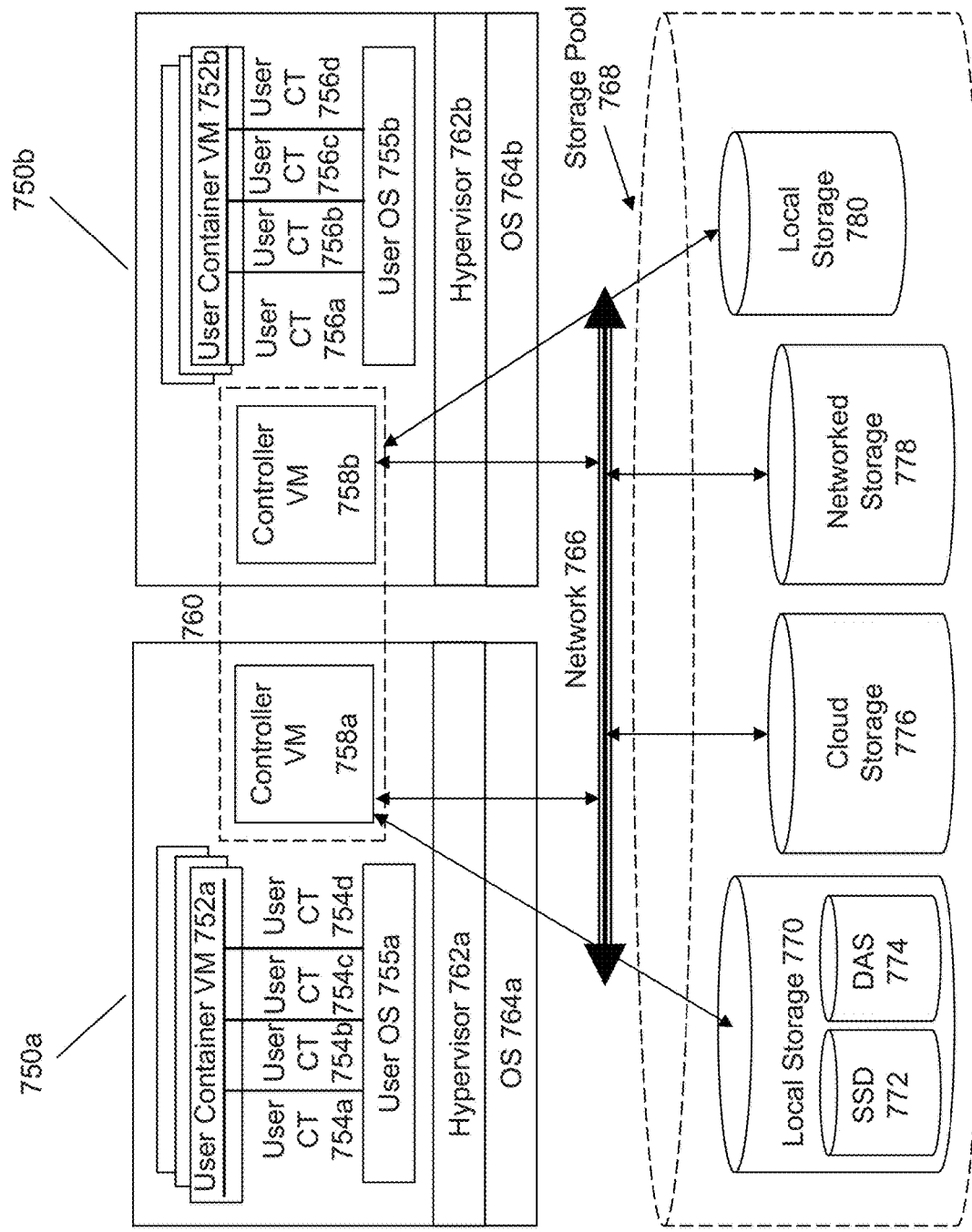
FIG. 7B illustrates an alternative example networked virtualization system according to some embodiments of the invention.

FIG. 7B illustrates an alternative approach for virtualized computing environments using containers. Generally, containers are a type of operating-system level application virtualization, in which the containers run applications in individual execution environments that are isolated from the host operating system and from each other. Some existing systems for running containerized applications include Linux LXC and Docker.

Containers running applications (e.g., containerized applications) have the benefit of being very fast to get up and running because no guest operating system must be installed for the application. The container may interface with the host computer or computers on a network through one or more virtualized network connections, which is managed by a container manager. For example, a web-server container may run a web-server application which is addressed by an IP addressed assigned to the container. To address or access the web-server container, a user or computer may use the IP address, which is intercepted by a container manager and routed to the container. Because the container is isolated from the host operating system, such as if the container application is compromised (e.g., hacked), the malicious entity doing the hacking will be trapped inside the container. However, to increase security, a containerized system may be implemented within a virtual machine. In this way, containerized applications can be quickly modified/updated within the container execution environment, and if one or more of the containers is breached, it will not affect the physical host computer because the container execution environment is still behind a virtual machine.

In FIG. 7B, an approach is illustrated for running containers within a distributed storage system, such as the system of FIG. 7A. Though FIG. 7B illustrates a particular architecture involving a controller virtual machine and user virtual machine which has user containers, one of ordinary skill in the art appreciates that other configurations may be implemented as well. Other approaches, and configurations are discussed in U.S. Application No. 62/171,990, filed on Jun. 5, 2015, which is hereby incorporated by reference in its entirety.

In FIG. 7B, a distributed platform contains multiple servers 750a and 750b that manage multiple-tiers of storage. In some embodiments, the servers 750a and 750b are physical machines with hardware layer such as memory or processors (not depicted) upon which an operating system may be installed. The managed multiple tiers of storage include storage that is accessible through a network 766, such as cloud storage 776 or networked storage 778 (e.g., a SAN or "storage area network"). Additionally, the present embodiment also permits local storage 770 and/or 780 that is within or directly attached to the server and/or appliance to be managed as part of the storage pool 768. Examples of such storage include SSDs 772, HDDs, "spindle drives," or other types of local storage that is directly attached (e.g., direct attached storage, DAS 774). These storage devices, both local and networked, collectively form a storage pool 768. Virtual disks (or "vDisks") can be structured from the storage devices in the storage pool 768, as described in more detail below. As used herein, the term vDisk refers to the storage abstraction that is exposed by a controller/service VM to be used by a user VM or a user container (CT). In some embodiments, the vDisk is exposed via iSCSI ("internet small computer system interface") or NFS ("network file system") and is mounted as a virtual disk on the user VM.

Each server 750a or 750b runs virtualization software, such as VMware ESX(i), Microsoft Hyper-V, or RedHat KVM. The virtualization software includes a hypervisor 762a-b to manage the interactions between the underlying hardware and the one or more user CTs that run client software, such as containerized applications.

The servers 750a-b may implement virtual machines with an operating system 764a-b that supports containers (e.g., Linux) and VM software, such as hypervisors 762a-b. In particular, as illustrated in FIG. 7A for example, node or server 750a runs a controller VM 758a and a user container VM 752a that runs one or more containers 754a-d from a user OS 755a. Each of the user containers may run a container image that may be layered to appear as a single file-system for that container. For example, a base layer may correspond to a Linux Ubuntu image, with an application execution layer on top; the application execution layer corresponding to a read/write execution environment for applications, such as MySQL, web servers, databases or other applications.

In some embodiments, the controller virtual machines 758a-b are used to manage storage and I/O activities for the user containers 754a-d. The controller virtualized computer is the "Storage Controller" in the currently described architecture. Multiple such storage controllers coordinate within a cluster to form a single-system. The Controller VMs 758a-b are not formed as part of specific implementations of respective hypervisors 762a-b. Instead, each controller VM runs as a virtual machine above its respective hypervisors 762a-b on the various servers 750a and 750b, and work together to form a distributed system 760 that manages all the storage resources, including the locally attached storage 770/780 the networked storage 778, and the cloud storage 776.

Each controller VM 758a-b exports one or more block devices or NFS server targets that appear as disks to the user container VM 752a-b. These disks are virtual, since they are implemented by the software running inside the controller VMs 758a-b. Thus, to the User-Container VMs 752a-b, the controller VMs 758a-b appear to be exporting a clustered storage appliance that contains some disks. All user data (including the operating system) in the user-container VMs 752a-b resides on these virtual disks. The containers run from within the respective user container VMs 752a-b may use the user OSs 755a-b to run isolated containerized directories. Further, each user OS 755a-b may have a container manager installed (e.g., Docker, LXC) to run/manage containers on each respective user container VM 752a-b.

Significant performance advantages can be gained by allowing the virtualization system to access and utilize local (e.g., server-internal) storage 770 as disclosed herein. This is because I/O performance is typically much faster when performing access to local storage 770 as compared to performing access to networked storage 778 across a network 766. This faster performance for locally attached storage 770 can be increased even further by using certain types of optimized local storage devices, such as SSDs 772.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 770. On the other hand, data that does not require fast access or which is accessed infrequently can be stored in the networked storage devices 778 or in cloud storage 776. Further details regarding an exemplary approach for implementing the virtualization environment are described in U.S. Pat. No. 8,601,473, which is hereby incorporated by reference in its entirety.

In this way, the security and robustness of a distributed storage system using virtual machines (as illustrated in FIG. 7A) may be combined with efficiency and consistency of a container virtualized computer/application environment.

Figure 8:
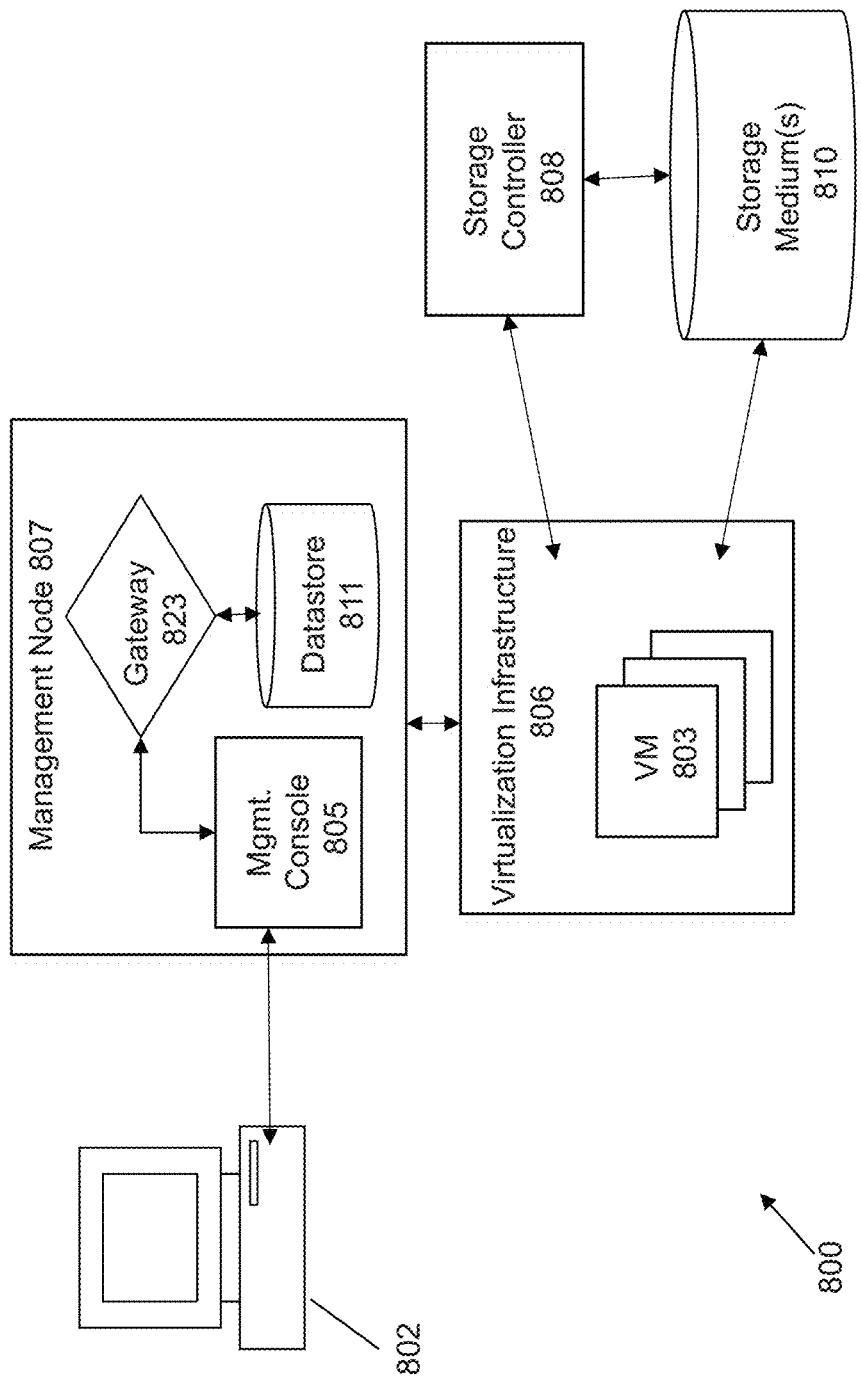
FIG. 8 illustrates a system to implement a virtualization management console according to some embodiments of the invention.

FIG. 8 illustrates a system 800 to implement a virtualization management console 805 according to some embodiments of the invention.

The system 800 includes one or more users at one or more user stations 802 that use the system 800 to operate the virtualization system 800 and/or management console 805. The user station 802 comprises any type of computing station that may be used to operate or interface with the system 800. Examples of such user stations include, for example, workstations, personal computers, or remote computing terminals. The user station 802 comprises a display device, such as a display monitor, for displaying a user interface to users at the user station. The user station 802 also comprises one or more input devices for the user to provide operational control over the activities of the system 800, such as a mouse or keyboard to manipulate a pointing object in a graphical user interface.

System 800 includes virtualization infrastructure 806, comprising any processing components necessary to implement and provision one or more VMs 803. This may include management components to obtain the status of, to configure, and/or to control the operation of one or more storage controllers and/or storage mediums 810. Data for the VMs 803 are stored in a tangible computer readable storage device 810. The computer readable storage device 810 comprises any combination of hardware and software that allows for ready access to the data that is located at the computer readable storage device 810. The storage controller 808 is used to manage the access and operation of the computer readable storage device 810. While the storage controller is shown as a separate component here, it is noted that any suitable storage controller configuration may be employed. For example, in some embodiments, the storage controller can be implemented as a virtual machine as described in more detail below. As noted in more detail below, the virtualization infrastructure 806 may correspond to a cluster of multiple nodes that are integrated as a single system.

System 800 includes a management console 805 included in a management node 807. The management console 805 provides an interface that permits an administrator to manage and administer the operation of the system. According to some embodiments, the management console 805 comprises a JavaScript program that is executed to display a management user interface within a web browser at the user station 802. In some embodiments, the storage controller exposes an API or GUI to create, read, update, delete (CRUD) data stores at the computer readable medium 810, which can be managed by the management console 805.

In operation in some embodiments, a web browser at the user station 802 is used to display a web-based user interface for the management console. The management console 805 corresponds to JavaScript code to implement the user interface. Metadata regarding the system 800 is maintained at a data store 811, which collects data relating to the virtualization infrastructure 806, the storage mediums 810, and/or datastores at the storage mediums. The JavaScript code interacts with a gateway 823 to obtain the metadata to be displayed in the user interface. In some embodiments, the gateway comprises a web server and servlet container, e.g., implemented using Apache Tomcat. Further details regarding methods and mechanisms for implementing virtualization management console illustrated in FIG. 8 are described in U.S. Provisional Patent Application No. 62/108,515, which is hereby incorporated by reference in its entirety.

Figure 9:
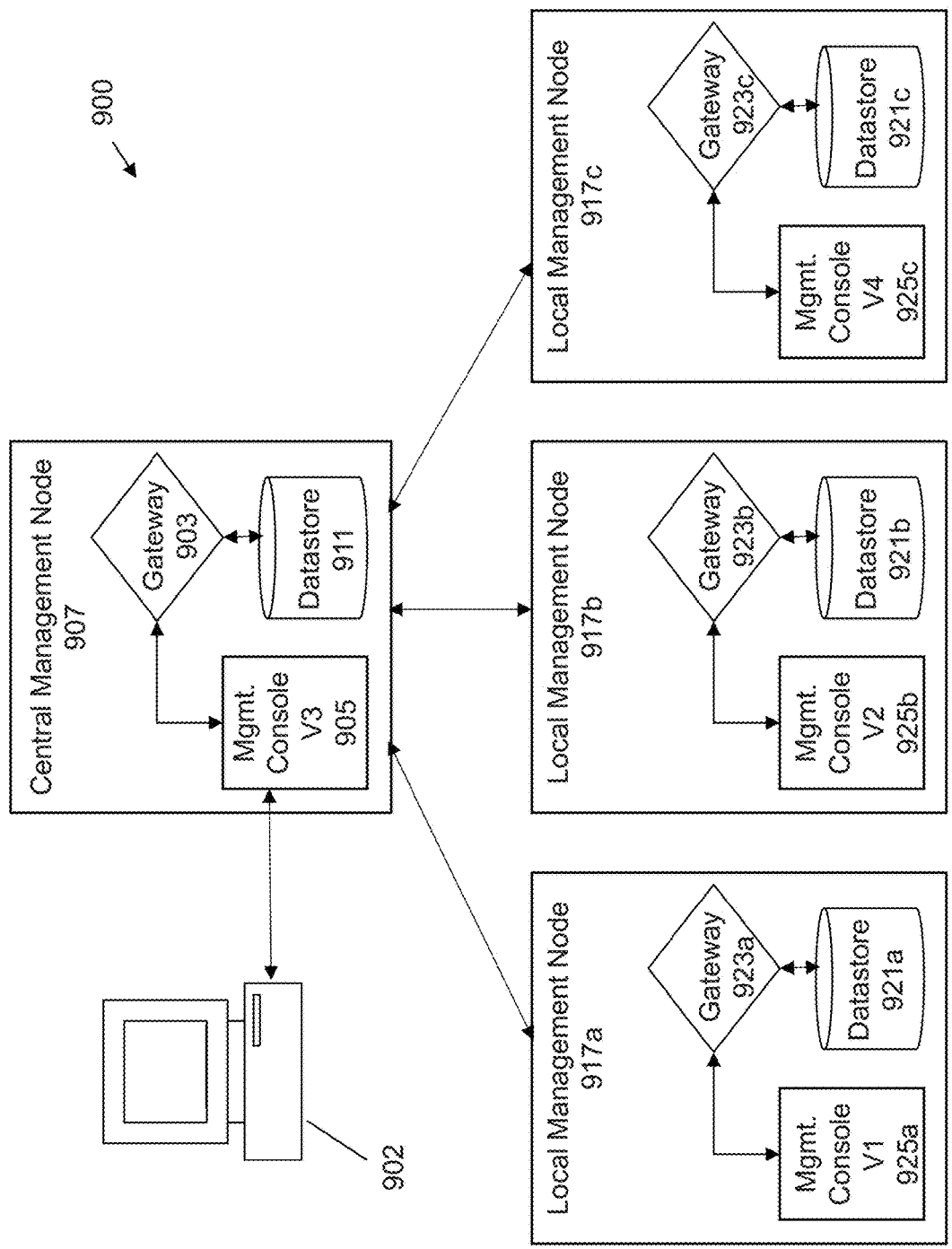
FIG. 9 illustrates a computing environment having multiple underlying systems/clusters to be managed, where a separate management node exists for each of the underlying systems/clusters.

FIG. 9 illustrates a larger computing environment having multiple underlying systems/clusters that need to be managed, where a separate management node exists for each of the underlying systems/clusters.

Similar to FIG. 8, the system 900 includes one or more users at one or more user stations 902 that use the system 900 to operate the virtualization system 900 and/or management console 905. The user station 902 comprises any type of computing station that may be used to operate or interface with the system 900 and a display device, such as a display monitor, for displaying a user interface to users at the user station. The user station 902 also comprises one or more input devices for the user to provide operational control over the activities of the system 900, as described above.

The approach for hypervisor attached volume group load balancing may be performed in an environment including a central management node 907 for one or more clusters that includes its own management console 905, gateway 903, and datastore 911. Shown here are local management nodes 917a, 917b, and 917c. Each of these management nodes includes its own management console 925a-c, gateway 923a-c, and datastore 921a-c. Further details regarding methods and mechanisms for implementing virtualization management console illustrated in FIG. 9 are described in U.S. Provisional Patent Application No. 62/108,515, which is hereby incorporated by reference in its entirety.

System Architecture

Figure 10:
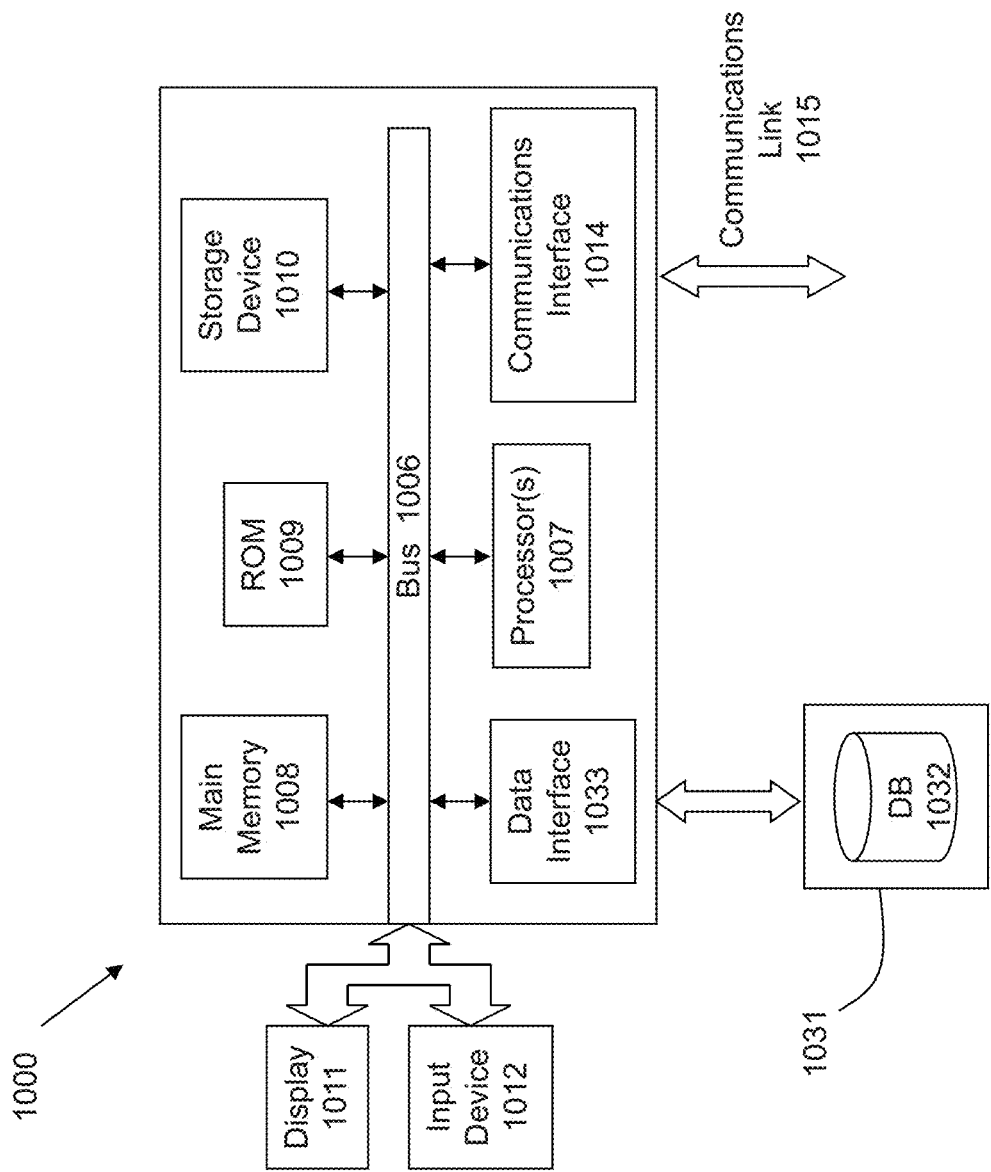
FIG. 10 is a block diagram of a computing system suitable for implementing an embodiment of the present invention.

FIG. 10 is a block diagram of an illustrative computing system 1000 suitable for implementing an embodiment of the present invention. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control.

According to some embodiments of the invention, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1010 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
partitioning a volume group having multiple logical unit numbers (LUNs) into multiple shards;
assigning a first shard of the multiple shards from a second controller executing on a second node to a first controller executing on a first node and assigning a second shard of the multiple shards from the first controller to the second controller, based at least in part on a load the second controller having a lower load than the first controller;
establishing a connection between a virtual machine on the second node to the first controller for the virtual machine to access data within the volume group;
directing, by the first controller, an access request from the virtual machine to access the first shard via the connection; and
storing information describing assignment of the first and second shards.

2. The method of claim 1, further comprising:
reassigning the first shard to a different controller in a virtualization system based at least in part on an additional load in the virtualization system, wherein a different connection is established between the second node and the different controller for the virtual machine to access the first shard, and the information is updated to reflect assigning the first shard to the different controller.

3. The method of claim 1, wherein the connection comprises an iSCSI connection, and the iSCSI connection is established at least by:
processing a login request, from the virtual machine at least by redirecting the login request from the second controller to the first controller.

4. The method of claim 1, wherein the first shard assigned from the second controller to the first controller comprises at least two LUNS.

5. The method of claim 1, wherein a load of the first or the second controller is determined based at least in part upon a separate limit, and both the first controller and the second controller are characterized by being capable of servicing the access request to access the first shard based at least in part upon a load balancing policy and the assignment between the multiple shards and respective controllers in a virtualization system.

6. The method of claim 1, wherein the information describing the assignment comprises first mapping information that maps a specific shard of the multiple shards in the volume group of a virtualization system to a corresponding controller of multiple controllers and second mapping information that maps a LUN of the multiple LUNS to a respective shard of the multiple shards.

7. A system, comprising:
a processor;
a memory for holding programmable code, wherein the programmable code includes instructions which, when executed by the processor, cause the processor at least to:
partition a volume group having multiple logical unit numbers (LUNs) into multiple shards;
assign a first shard of the multiple shards from a second controller executing on a second node to a first controller executing on a first node and assign a second shard of the multiple shards from the first controller to the second controller, based at least in part on the second controller having a lower load than the first controller;
establish a connection between a virtual machine on the second node to the first controller for the virtual machine to access data within the volume group;
direct, by the first controller, an access request from the virtual machine to access the first shard via the connection;
store information describing assignment of the first and second shards.

8. The system of claim 7, wherein the instructions in the programmable code are further executable to:
reassign the first shard to a different controller in a virtualization system based at least in part on an additional load in the virtualization system, wherein a different connection is established between the second node and the different controller for the virtual machine to access the first shard, and the information is updated to reflect assigning the first shard to the different controller.

9. The system of claim 7, wherein the connection comprises an iSCSI connection, and the iSCSI connection is established at least by:
processing a login request from the virtual machine at least by redirecting the login request from the second controller to the first controller.

10. The system of claim 7, wherein the first shard assigned from the second controller to the first controller comprises at least two LUNs.

11. The system of claim 7, wherein a load on the first or the second controller is determined based at least in part upon a separate limit, and both the first controller and the second controller are characterized by being capable of servicing the access request to access the first shard based at least in part upon a load balancing policy and the assignment between the multiple shards and respective controllers in a virtualization system.

12. The system of claim 7, wherein the information describing the assignment comprises first mapping information that maps a specific shard of the multiple shards in the volume group of a virtualization system to a corresponding controller of multiple controllers and second mapping information that maps a LUN of the multiple LUNs to a respective shard of the multiple shards.

13. A computer program product embodied on a non-transitory computer readable medium having, stored thereon a sequence of instructions which, when executed by a virtualization system, causes the virtualization system to perform a set of acts, the set of acts comprising:
partitioning a volume group having multiple logical unit numbers (LUNs) into multiple shards;
assigning a first shard of the multiple shards from a second controller executing on a second node to a first controller executing on a first node and assigning a second shard of the multiple shards from the first controller to the second controller, based at least in part on the second controller having a lower load than the first controller;
establishing a connection between a virtual machine on the second node to the first controller for the virtual machine to access data within the volume group;
directing, by the first controller, an access request from the virtual machine to access the first shard via the connection; and
storing information describing al-a assignment of the first and second shards.

14. The computer program product of claim 13, wherein the set of acts further comprises:
reassigning the first shard to a different controller in a virtualization system based at least in part on an additional load in the virtualization system, wherein a different connection is established between the second node and the different controller for the virtual machine to access the first shard, and the information is updated to reflect assigning the first shard to the different controller.

15. The computer program product of claim 13, wherein the connection comprises an iSCSI connection, and the iSCSI connection is established at least by:
processing a login request from the virtual machine at least by redirecting the login request from the second controller to the first controller.

16. The computer program product of claim 13, the first shard assigned from the second controller to the first controller comprises at least two LUNs.

17. The computer program product of claim 13, wherein a load on the first or the second controller is determined based at least in part upon a separate limit, and both the first controller and the second controller are characterized by being capable of servicing the access request to access the first shard based at least in part upon a load balancing policy and the assignment between the multiple shards and respective controllers in a virtualization system.

18. The computer program product of claim 13, wherein the information describing the assignment comprises first mapping information that maps a specific shard of the multiple shards in the volume group of a virtualization system to a corresponding controller of multiple controllers and second mapping information that maps a LUN of the multiple LUNs to a respective shard of the multiple shards.

* * * * *